(12) United States Patent
Yamaguchi et al.

(10) Patent No.: US 7,551,301 B2
(45) Date of Patent: Jun. 23, 2009

(54) RECEIVING APPARATUS, PRINT SYSTEM, AND MOBILE TELEPHONE

(75) Inventors: Takehito Yamaguchi, Hirakata (JP); Shigeki Matsunaga, Kadoma (JP)

(73) Assignee: Panasonic Corporation, Osaka (JP)

( * ) Notice: Subject to any disclaimer, the term of this patent is extended or adjusted under 35 U.S.C. 154(b) by 982 days.

(21) Appl. No.: 10/502,743

(22) PCT Filed: Jan. 20, 2003

(86) PCT No.: PCT/JP03/00400

§ 371 (c)(1),
(2), (4) Date: Jul. 28, 2004

(87) PCT Pub. No.: WO03/071795

PCT Pub. Date: Aug. 28, 2003

(65) Prior Publication Data

US 2005/0151881 A1 Jul. 14, 2005

(30) Foreign Application Priority Data

Feb. 25, 2002 (JP) .............................. 2002-048862

(51) Int. Cl.
*G06F 3/12* (2006.01)

(52) U.S. Cl. ...................... 358/1.15; 358/296; 725/133; 725/141; 725/153; 348/473; 348/552; 348/553; 348/14.01; 348/14.02; 455/557

(58) Field of Classification Search ................ 358/1.15, 358/296; 348/14.01, 14.02, 473, 552; 455/556.1, 455/557; 725/133, 141, 153
See application file for complete search history.

(56) References Cited

U.S. PATENT DOCUMENTS 5,010,498 A 4/1991 Miyata
5,459,819 A 10/1995 Watkins et al.

(Continued)

FOREIGN PATENT DOCUMENTS

EP 0 651 556 5/1995

(Continued)

OTHER PUBLICATIONS

European Office Action issued Sep. 22, 2008 in corresponding European Patent Application No. 03701786.0.

*Primary Examiner*—Houshang Safaipour
*Assistant Examiner*—Dennis Dicker
(74) *Attorney, Agent, or Firm*—Wenderoth, Lind & Ponack, L.L.P.

(57) ABSTRACT

A SI storage unit storing SI (program allocation information), a display program ID recording unit recording a display program ID which indicates a program displayed on a TV, an additional SI specification table recording unit recording a table for specifying an additional SI to be additionally printed together with pictures, and a print control unit obtaining a print instruction sent from a remote control, hold an image data to a screen data save unit, specify additional SI with reference to a display program ID recording unit and an additional SI specification table recording unit, read out the additional SI from the SI storage unit and send the readout additional SI to a combination unit. Further, the combination unit generates a print data by combining the image data held in the screen data save unit with the additional SI from the print control unit.

30 Claims, 33 Drawing Sheets

U.S. PATENT DOCUMENTS

| | | | |
|---|---|---|---|
| 5,530,793 A * | 6/1996 | Watkins et al. | 358/1.18 |
| 5,778,164 A | 7/1998 | Watkins et al. | |
| 6,870,571 B1 * | 3/2005 | Narushima et al. | 348/552 |
| 6,922,258 B2 * | 7/2005 | Pineau | 358/1.15 |
| 6,925,509 B2 * | 8/2005 | Ihara et al. | 710/62 |
| 7,047,551 B2 * | 5/2006 | Ogawa et al. | 725/141 |
| 2001/0002460 A1 * | 5/2001 | Nguyen et al. | 702/35 |
| 2001/0022003 A1 | 9/2001 | Narushima | |
| 2001/0032188 A1 * | 10/2001 | Miyabe et al. | 705/57 |
| 2001/0049784 A1 | 12/2001 | Nomoto | |
| 2001/0056578 A1 | 12/2001 | Hwang et al. | |
| 2002/0016964 A1 | 2/2002 | Aratani et al. | |
| 2002/0051160 A1 | 5/2002 | Ihara et al. | |
| 2005/0190295 A1 * | 9/2005 | Mizutome et al. | 348/553 |

FOREIGN PATENT DOCUMENTS

| | | |
|---|---|---|
| JP | 7-221975 | 8/1995 |
| JP | 8-279973 | 10/1996 |
| JP | 11-102550 | 4/1999 |
| JP | 11-355680 | 12/1999 |
| JP | 2001-36720 | 2/2001 |
| JP | 2001-136467 | 5/2001 |
| JP | 2001-157150 | 6/2001 |
| JP | 2001-218138 | 8/2001 |
| JP | 2001-223968 | 8/2001 |
| JP | 2001-237783 | 8/2001 |
| JP | 2002-27365 | 1/2002 |
| WO | 02/03698 | 1/2002 |

* cited by examiner

FIG. 3

20a — Additional SI Specification Table

| Additional SI | Print Position |
|---|---|
| Channel | Left of Header |
| Title | Center of Header |
| Cast | Center of Footer |
| ⋮ | ⋮ |

FIG. 16

120a Additional Program Information Specification Table

| Additional Program Information | Print Position |
|---|---|
| Stored Date | Left of Header |
| Comment | Center of Header |
| Title | Center of Footer |
| ⋮ | ⋮ |

Additional SI Specification Table

| Additional SI | Print Position |
|---|---|
| Channel | Left of the First Row in the Right Half |
| Title | Center of the First Row in the Right Half |
| Scene Description Information | On the Third Row or after in the Right Half |
| ⋮ | ⋮ |

FIG. 27  Print Body Data (Moving Picture and Data Broadcasting Content Coexistence)

```
<?xml version="1.0"?>
<!DOCTYPE html PUBLIC "-//PWG//DTD XHTML-Print 1.0//EN" "http://www.pwg.org/xhtml-print/xhtml-print10.dtd">
<html xmlns="http://www.w3.org/1999/xhtml">
  <head>
    <title>
      Test Pages
    </title>
  </head>
  <body>
    <div style="width:960px;height:540px;">
      <!--Image-->
      <object type="image/jpeg" data="video.jpeg" style="left:528px;top:40px;width:360px;height:202px"/>
      <!--A Button-->
      <object type="image/jpeg" data="btn1.jpeg" style="left:68px;top:100px;width:176px;height:48px;"/>
      <!--B Button-->
      <object type="image/jpeg" data="btn2.jpeg" style="left:68px;top:300px;width:176px;height:48px;"/>
      <!--BackButton-->
      <object type="image/jpeg" data="btn3.jpeg" style="left:68px;top:400px;width:176px;height:48px;"/>
      <!--NextButton-->
      <object type="image/jpeg" data="btn4.jpeg" style="left:500px;top:400px;width:176px;height:48px;"/>
    </div>
  </body>
</html>
```

FIG. 28   Print Data (Combination of Additional Information with Print Body Data)

```
<?xmlversion='1.0'?>
    <!DOCTYPEhtmPUBLIC-//PWG//DTDXHTML-Print1.0//EN"http://www.pwg.org/xhtml-print/xhtml-print10.dtd">
    <htmlxmlns='http://www.w3.org/1999/xhtml'>
        <head>
                    <title>
                                        TestPages
                    </title>
                    <style>
<![CDATA[
<!--Header/FooterUnitBeginning-->
                                                                @page{
<!--Header-->
                    @top{font-family:Helvetica,Arial,sans-serif;
 font-size:150%;
 font-weight:bolder;
 text-align:left;
 content:'B S 1 2 3   Mt.FujiandMan';
 }
<!--Footer-->
                                        @bottom{font-family:Times,Palatino,serif;
 font-size:80%;
 font-weight:normal;
 text-align:right;
 content:'FujioYamamoto';
 }
 }
<!--Header/FooterUnitEnd-->
]]>
                                </style>
                </head>
                <body>
                            <divstyle='width:960px;height:540px;'>
<!-- Image -->              <objecttype='image/jpeg'data='video.jpeg'style='left:528px;top:40px;width:360px;height:202px'/>
<!-- A  Button -->           <objecttype='image/jpeg'data='btn1.jpeg'style='left:68px;top:100px;width:176px;height:48px;'/>
<!-- B  Button-->            <objecttype='image/jpeg'data='btn2.jpeg'style='left:68px;top:300px;width:176px;height:48px;'/>
<!--BackButton-->            <objecttype='image/jpeg'data='btn3.jpeg'style='left:68px;top:400px;width:176px;height:48px;'/>
<!-- Next Button -->         <objecttype='image/jpeg'data='btn4.jpeg'style='left:500px;top:400px;width:176px;height:48px;'/>
                            </div>
                </body>
</html>
```

FIG. 29

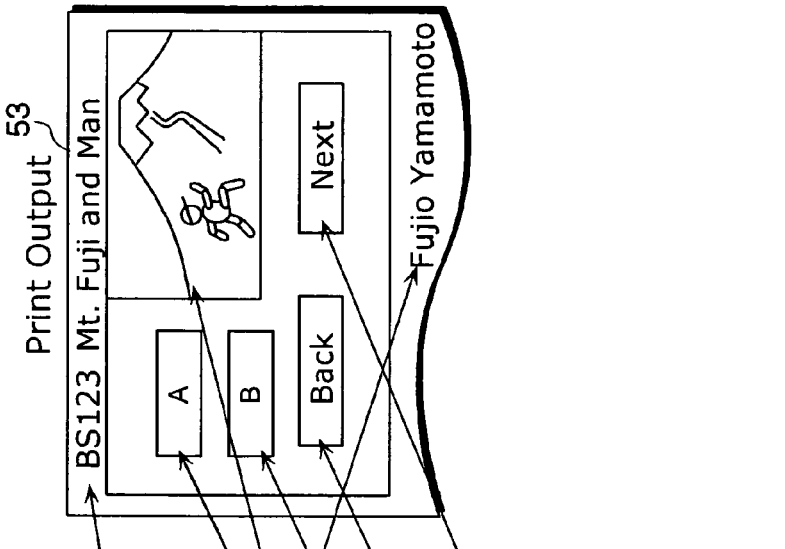

Print Output 53

Print Data

```
<?xml version="1.0"?>
<!DOCTYPE html PUBLIC "-//PWG//DTD XHTML-Print 1.0//EN"
"http://www.pwg.org/xhtml-print/xhtml-print10.dtd">
<html xmlns="http://www.w3.org/1999/xhtml">
<head>
<title>Test Pages</title>
<style>
<![CDATA[
<!--Header/FooterUnit Beginning-->
@page{
<!--Header-->
@top{font-family:Helvetica,Arial,sans-serif;
font-size:150%;font-weight:bolder;text-align:left;content:"B S 1 2 3 Mt.FujiandMan";}
<!--Footer-->
@bottom{font-family:Times,Palatino,serif;
font-size:80%;font-weight:normal;text-align:right;content:"FujioYamamoto";}
}
<!--Header/FooterUnit End-->
]]>
</style>
</head>
<body>
<div style="width:960px;height:540px;">
<!--Image-->
<object type="image/jpeg"data="video.jpeg"
style="left:528px;top:40px;width:360px;height:202px"/>
<!--A Button-->
<object type="image/jpeg"data="btn1.jpeg"
style="left:68px;top:100px;width:176px;height:48px;"/>
<!--BButton-->
<object type="image/jpeg"data="btn2.jpeg"
style="left:68px;top:300px;width:176px;height:48px;"/>
<!--BackButton-->
<object type="image/jpeg"data="btn3.jpeg"
style="left:68px;top:400px;width:176px;height:48px;"/>
<!--Next Button-->
<object type="image/jpeg"data="btn4.jpeg"
style="left:500px;top:400px;width:176px;height:48px;"/>
</div>
</body>
</html>
```

FIG. 30    Print Body Data (Moving Picture Only)

```
<?xml version="1.0"?>
<!DOCTYPE html PUBLIC "-//PWG//DTD XHTML-Print1.0//EN""http://www.pwg.org/xhtml-print/xhtml-print10.dtd">
<html xmlns="http://www.w3.org/1999/xhtml">
  <head>
    <title>
      TestPages
    </title>
  </head>
  <body>
    <div style="width:960px;height:540px;">
      <!-- Image -->
      <object type="image/jpeg" data="video.jpeg" style="left:528px;top:40px;width:360px;height:202px;"/>
    </div>
  </body>
</html>
```

FIG. 31    Print Body Data (Data Broadcasting Content Only)

```
<?xml version="1.0"?>
<!DOCTYPE html PUBLIC "-//PWG//DTD XHTML-Print 1.0//EN" "http://www.pwg.org/xhtml-print/xhtml-print10.dtd">
<html xmlns="http://www.w3.org/1999/xhtml">
    <head>
        <title>
            TestPages
        </title>
    </head>
    <body>
        <div style="width:960px;height:540px;">
            <!-- A Button -->
                <object type="image/jpeg" data="btn1.jpeg" style="left:68px;top:100px;width:176px;height:48px;"/>
            <!-- B Button -->
                <object type="image/jpeg" data="btn2.jpeg" style="left:68px;top:300px;width:176px;height:48px;"/>
            <!-- Back Button -->
                <object type="image/jpeg" data="btn3.jpeg" style="left:68px;top:400px;width:176px;height:48px;"/>
            <!-- Next Button -->
                <object type="image/jpeg" data="btn4.jpeg" style="left:500px;top:400px;width:176px;height:48px;"/>
        </div>
    </body>
</html>
```

RECEIVING APPARATUS, PRINT SYSTEM, AND MOBILE TELEPHONE

BACKGROUND OF THE INVENTION

1. Field of the Invention

This invention relates to a receiving apparatus and the like for receiving data distributed via a transmission line, especially a receiving apparatus and the like having a function of outputting the received data as print data.

2. Description of the Related Art

A television receiving set is a major apparatus for receiving data distributed via a transmission line. When a favorite image is displayed on a television screen, we may wish to keep the image as a printed form by outputting the image to a printing apparatus. In a conventional technology, a video printer is used as a method of making a hard copy of an image displayed on a television screen. While connecting an image signal inputted on a television receiving set to a video printer by ramifying the image signal, a printed favorite scene can be obtained by pushing a print button of a video printer when the favorite scene is displayed on a television screen. Additionally, writing a memo such as program title and broadcasting date in the margin of a print paper helps a user from forgetting about what the scene printed out was and it also helps for filing the printout.

However, it is inconvenient to hand-write additional information, such as program title and broadcasting date, on a print paper every time a display is hard copied. A user may write incorrect information by mistake. Also, it is difficult to write in well-organized characters. In particular, it becomes a very complicated work to do as the number of times to make a hard copy increases.

Thus, this invention is directed to a method of using functions of header and footer in a word processing software used on a computer such as personal computer is suggested as a way to automatically print additional information while printing out a document and the like. When printing a document and the like, additional information such as printing date, file name and the like are printed in the margin of a print paper by adding header and footer. However, in this case, the additional information to be printed as header and footer needs to be included in a document to be printed. In other words, the additional information to be header and footer and a whole document need to be clearly associated and united with each other in advance.

However, on television broadcasting, a program and its additional information are not sent in a united form. Therefore, it is difficult to realize an automatic printing of additional information using functions of header and footer of word processing software.

Considering such conditions, the present invention, as a receiving apparatus for television broadcasting and the like, aims to provide a receiving apparatus and the like having a convenient printout function which is capable of printing out received data with its additional information without doing any special operations.

BRIEF SUMMARY OF THE INVENTION

To achieve above objectives, a receiving apparatus according to the present invention includes: a receiving unit operable to receive data distributed via a transmission line; a print instruction obtainment unit operable to obtain a print instruction; a print object specification unit operable to specify, at the time when the print instruction is obtained, distributed data indicated in the print instruction, as a picture to be printed, among the distributed data received by the receiving unit and specify additional information in association with the specified picture to be printed together with the additional information; and an output unit operable to output the picture and the additional information that are associated with each other as print data to be printed on a single print paper.

Accordingly, the received distribution data and the additional information are automatically associated with each other and outputted as a print data. Therefore, a viewer can obtain a single piece of paper, on which a print picture and additional information are printed, only by sending a print instruction. That is, a process of handwriting a comment and the like are unnecessary.

In here, the distributed data includes a program provided by broadcasting, the receiving unit further receives program information that is information relating to the program, and the print object specification unit can specify a program indicated in the print instruction and specify program information corresponding to the specified program as the additional information. For example, the program information indicates at least one of a broadcasting time, a title, a program title, a cast, a channel and a program outline for each program, and the print object specification unit specifies at least one of the broadcasting time, the title, the program title, the cast, the channel and the program outline as the additional information. Consequently, the viewer can obtain a print output of a screen which comes along with a print of information relating to a program such as a title only by sending a print instruction at a specified scene.

Also, the receiving apparatus further comprises a display output unit operable to output, for display or as a signal, the distributed data received by the receiving unit, wherein the print object specification unit can specify distributed data of a program as the picture to be printed, the program for being outputted for display or as a signal by the display output unit at a point in time when the print instruction is obtained.

Further, the receiving apparatus comprises a program identification information recording unit operable to record program identification information for identifying the program to be outputted for display or as the signal by the display output unit, wherein the print object specification unit can specify program information as the additional information, the program information corresponding to the program indicated in the program identification information recorded in the program identification information recording unit. Additionally, the receiving apparatus according may include: a channel information recording unit operable to record channel information that indicates a selected channel; and a time unit operable to indicate present time, wherein the program information can indicate a channel and broadcasting time for each program, the print object specification unit specifies, as the additional information, the program information associated with the program specified by the channel and the time, the channel being indicated in the channel information recorded in the channel information recording unit, and the time being indicated by the time unit at the time when the print instruction is obtained. Accordingly, the distribution data being display outputted is going to be printed. A viewer can specify an object to be printed while watching a displayed distribution data.

Further, a data to be printed can be an image data held in a frame buffer and the like, a broadcasting data described in markup language, and print exclusive information generated for printing.

Furthermore, the program information may include description information that describes an explanation for each scene or a frame picture constituting a program, and the print object specification unit can specify the description information as the additional information. That is, the receiving apparatus further comprises a scene specification unit operable to specify the scene or the frame picture to be outputted for display or as a signal by the display output unit, wherein the print object specification unit can specify the description information as the additional information, the description information corresponding to the scene or the frame picture specified by the scene specification unit.

In here, the scene specification unit specifies, as a specification method for the scene or the frame, the scene or the frame picture based on: the program to be outputted for display or as a signal by the display output unit; and the time when the print instruction is obtained. The scene specification unit can specify the scene or the frame picture based on the channel and the time when the print instruction is obtained, the channel being selected at the time. The description information can be description information for each scene associated with one or more frame pictures, and the scene specification unit can specify a scene to which the frame picture belongs, the frame picture being outputted for display or as a signal by the display output unit.

Thus, the description information for explaining a scene or a frame picture is print outputted together with a print picture not by a unit of a program, but by a unit of a scene or a frame picture. Therefore, in the case where a plurality of hard copies is printed on a single program at different timings, the additional information to be printed on the hard copies has a different content according to a scene or a frame picture. Accordingly, it becomes possible to easily distinguish and organize the plurality of hard copies.

Further, the receiving apparatus may further comprise an accumulation unit operable to accumulate the program and the program information received by the receiving unit, wherein the print object specification unit specifies the print picture and the additional information for the program and the program information accumulated by the accumulation unit.

Further, concerning a print position of a print picture and the additional information, the print picture can be printed as a print body and the additional information as a header and a footer on the print paper, or the print picture and the additional information can be printed in a layout in which the print picture and the additional information are horizontally aligned on a single print paper.

Further, the output unit can combine the print picture with the additional information that are associated with each other, as a print data for printing on a single print paper, and output the print data. Also, the picture forming apparatus can combine the print picture with the additional information included in the print data into a data for printing on a single print paper and print out the combined data.

Furthermore, the present invention can be realized as a cellular phone which receives content distributed from a server apparatus via a transmission line. The cellular phone including: a recording unit operable to receive identification information and catalog information and record the received information, the identification information identifying the content provided by the server apparatus, and the catalog information being information relating to the content; a content obtainment display unit operable to request a distribution of content by sending the identification information to the server apparatus, receive and display the distributed content, the identification information being selected by an operator among the received identification information; a print instruction obtainment unit operable to obtain a print instruction; a print object specification unit operable to i) specify, at the time when the print instruction is obtained, a picture displayed by the content obtainment display unit as a picture to be printed, ii) read out catalog information of the content corresponding to the identification information that an operator selected from the recording unit, and iii) specify the readout catalog information as additional information in association with the picture to be printed together with the additional information; and a print output unit operable to combine the print picture and the additional information that are associated with each other as print data to be printed on a single print paper and output the combined print data.

Consequently, while enjoying an image on a screen downloading a content into a cellular phone not only via a television broadcast but also by a stream distribution and the like via the Internet and the like, a printer apparatus connected to the cellular phone or a printer apparatus on the Internet can print output additional information such as a title of a content and a distribution date together with the picture and the information by sending a print instruction at a moment when a favorite picture and information are displayed. In addition, it becomes possible to obtain a convenient print output together with the additional information in the outside as well as in the inside.

As described, according to the present invention, it becomes possible to obtain a hard copy of a screen in which additional information is printed in a header and the like without performing special operations. In particular, a practical value of this invention is extremely high in a present day when a content distribution by a digital broadcasting and the Internet is developing.

Also, the output unit may combine the print picture with a copyright mark and the additional information as print data so that the copyright mark and the additional information are written over the print picture, and output the print data. Accordingly, the copyright mark and the additional information are compulsorily written over the print picture so that the copyright of the print picture is protected. In addition, the receiving apparatus combines the print data so that the processing load on the picture forming apparatus that prints out the print data can be reduced.

Further, the combination unit may combine the print picture with the additional information to write the additional information over the print picture in the case where the print control command instructs to protect a copyright of the print picture. Accordingly, the print picture is combined with a copyright mark and the additional information so as to write the copyright mark and the additional information over the print picture. Therefore, it becomes possible to print a copyright indicator and the like displayed in beautiful characters using a font previously held in the picture forming apparatus, while protecting a copyright of the print picture.

Note that, the present invention can be realized not only as the receiving apparatus and the cellular phone, but also as a print system comprising of a receiving apparatus, a cellular phone and a picture forming apparatus as well as a program causing a computer to function units equipped to the receiving apparatus, the picture forming apparatus and the cellular phone. In addition, it is needless to say that such program can be widely distributed via a recording medium such as CD-ROM and a transmission medium such as the Internet.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings

FIG. 3 is a diagram showing an example of an additional SI specification table stored in an additional SI specification table recording unit of the digital broadcasting receiving apparatus.

FIG. 16 is a diagram showing an example of an additional program information specification table stored in an additional program information specification table recording unit in the digital broadcasting receiving apparatus.

FIG. 21 is a diagram showing an example of an additional SI specification table stored in an additional SI specification table recording unit in the digital broadcasting receiving apparatus.

FIG. 27 is a diagram showing an example of print body data which made up of a top page file and one or more image files written in markup language.

FIG. 28 is a diagram showing an example of data combined of the additional information and the print body data.

FIG. 29 is a diagram showing a relationship of a print output and print data.

FIG. 30 is a diagram showing an example of print body data in the case where the broadcasting content only includes moving pictures.

FIG. 31 is a diagram showing an example of print body data in the case where the broadcasting content only includes data broadcasting content.

DETAILED DESCRIPTION OF THE INVENTION

The following explains in detail about embodiments of the present invention with references to diagrams.

First Embodiment

Figure 1:
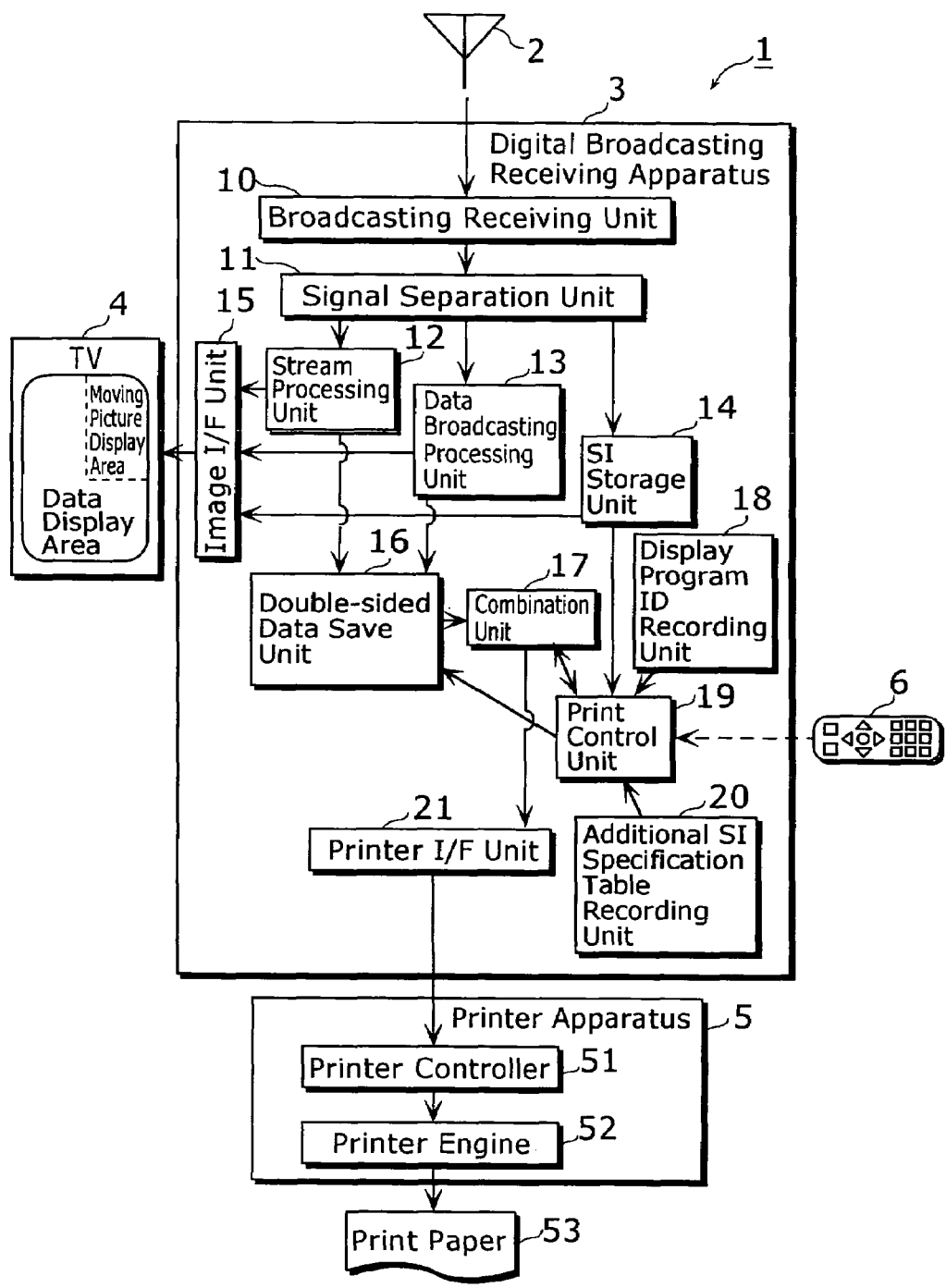
FIG. 1 is a functional block diagram showing a configuration of a print system according to a first embodiment of the present invention.

FIG. 1 is a functional block diagram of showing a configuration of a print system 1 according to the first embodiment of the present invention. The print system 1 is a system for printing non-accumulated data, that is, a system that can print an image and the like together with additional information such as program title, the image being broadcasted, received and displayed on a television screen at the time, the system comprising an antenna 2, a digital broadcasting receiving apparatus 3, a TV 4, a printer apparatus 5, and a remote control 6.

The antenna 2 is a parabolic antenna and the like designed for digital television broadcasting. The TV 4 is a television receiving set and the like on which image signals from the digital broadcasting receiving apparatus 3 are displayed. The remote control 6 may have a button not only for general operations on the digital broadcasting receiving apparatus 3 and the TV 4, but also may include a button designed for sending a print instruction to the digital broadcasting receiving apparatus 3.

The printer apparatus 5 comprises a printer controller 51, a printer engine 52 and the like, the printer controller 51 accumulates print data sent from the digital broadcasting receiving apparatus 3, decodes and rasterizes the accumulated print data, and the printer engine 52 prints out the image data obtained by rasterization of the print sheet 53.

The digital broadcasting receiving apparatus 3 is a digital broadcasting receiving apparatus such as a set top box (STB) which has a function of outputting an image as a print data displayed on the TV4 when a viewer sent a print instruction to the printer apparatus 5, while performing receiving and selecting processes of signals sent from the antenna 2 and sending image signals to the TV 4. The digital broadcasting receiving apparatus comprises a broadcasting receiving unit 10, a signal separation unit 11, a stream processing unit 12, a data broadcasting processing unit 13, a SI storage unit 14, an image I/F unit 15, a screen data save unit 16 (e.g., a double-sided data save unit), a combination unit 17, a display program ID recording unit 18, a print control unit 19, an additional SI specification table recording unit 20, and a printer I/F unit 21.

The broadcasting receiving unit 10 is a tuner, a demodulator and the like. The signal separation unit 11 is a TS (transport stream) decoder and the like, the TS decoder decoding received data sent from the broadcasting receiving unit 10 and separating the decoded data into an elementary stream, controlling information and the like. The signal separation unit outputs the separated and inputted moving picture and an audio stream to the stream processing unit 12, outputs data stream for data broadcasting to the data broadcasting processing unit 13, and outputs SI (service information including information, such as program arrangement information) to the SI storage unit 14.

The stream processing unit 12 is a MPEG decoder and the like, the MPEG decoder decoding the moving picture and the audio stream sent from the signal separation unit 11 and outputting the decoded/separated moving picture and the audio stream to the image I/F unit 15 and the screen data save unit 16. The stream processing unit has a frame buffer and the like, the frame buffer temporally holding moving picture plane (image data) obtained through the decoding.

The data broadcasting processing unit 13 is a processing unit operable to decode and develop the data stream sent from the signal separation unit 11, and output the data stream to the image I/F unit 15 and the screen data save unit 16. The data broadcasting processing unit 13 has a buffer memory and the like, the buffer memory temporally holding image data such as still picture plane, character plane and the like obtained by the development. This data stream, for example, is broadcasting data described in BML (Broadcast Markup Language) including moving pictures, still pictures, characters and the like.

Figure 2:
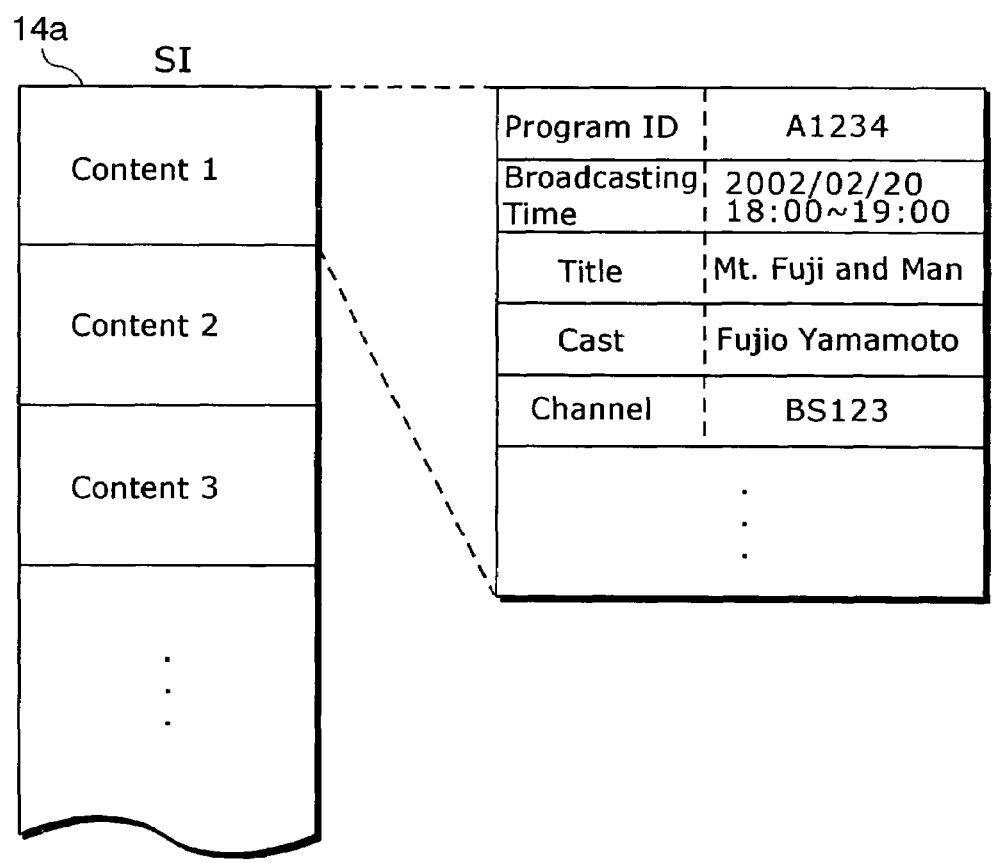
FIG. 2 is a diagram showing an example of SI stored in a SI storage unit of a digital broadcasting receiving apparatus.

The SI storage unit 14 stores the SI sent from the signal separation unit 11 and outputs the stored SI to the image I/F unit 15 and the print control unit 19 based on an instruction from the print control unit 19. FIG. 2 is a diagram showing an example of SI 14a stored in the SI storage unit 14. The SI 14a is program information to be provided for viewers by a broadcaster prior to the program broadcasting, including "program ID", "broadcasting time", "title", "casts", "channel" and the like for each content (program). The program ID ("A1234" etc.) is a unique symbol to identify one program among all programs being broadcasted at a moment. In the present embodiment, this program ID as a key, the SI stored in the SI storage unit 14 is associated with a display picture and printed out as additional information in addition to the image.

The image I/F unit 15 is a signal processing unit of generating an image signal such as figure L-type screen and the like and outputting the image signal with audio signal to the TV 4 by receiving moving pictures and audio data being sent from the stream processing unit 12, still pictures, character data and the like being sent from the data broadcasting processing unit 13, and SI being sent from the SI storage unit 14 and performing a picture combination and the like, the figure L-type screen containing a display area for moving pictures (moving picture display area) and display area for data broadcasting (data display area).

The screen data save unit 16 receives a notice stating that a viewer sent a print instruction from the print control unit 19, and reads out a moving picture to be displayed at the time, that is, moving picture data held in a frame buffer of the stream processing unit 12 and the still picture, characters and the like held in a buffer memory of the data broadcasting processing unit 13 and holds temporally as moving picture data to be printed, the screen data save unit being buffer memory and the like.

The combination unit 17 i) receives the notice (additional SI and information indicating a print position thereof) from the print control unit 19, ii) compounds the additional SI and image data making the image shown by the image data as a center of print (print body) and the additional SI as additional information, iii) generates print data laid out in a position such as header and footer on a print paper 53, and iv) reports about the process to the print control unit 19. Note that, the additional SI is the specified SI to be printed among the SI stored in the SI storage unit 14 (for example, a title of a program etc). Furthermore, the combination is a process of generating one print data (one print job) in a format that the printer 5 can interpret, the one print data including a print control script and data itself (image data and SI), the print control script describing that the combination, for example, is image data as a print body and the additional SI (text order) as the header and the like.

The display program ID recording unit 18 is a memory and the like, a memory being on which record information (display program ID) for uniquely identifying the program displayed on the TV 4 at a moment. The information is rewritten interlocking with a channel selection process by the broadcasting receiving unit 10 and the signal separation unit 11. The "display program ID" is, for example, an ID of a program which a viewer selected using an EPG (Electronic Program Guide), and the same information as "program ID" which constitutes SI. That is, the "display program ID" stored in the display program ID recording unit 18 is a program actually broadcasted and selected, the program coinciding with one of the "program ID" stored in the SI storage unit 14 as SI 14a.

Note that, in the present embodiment, the digital broadcasting receiving apparatus 3 does not have a mass storage recording apparatus such as hard disk on which broadcasted programs are stored. Therefore, the program (non accumulated data) being received at a moment is displayed on the TV 4 in real time and to be printed.

The print control unit 19 i) receives a print instruction sent by the remote control 6, ii) refers to information stored in the display program ID recording unit 18 and the additional SI identification table recording unit 20, and iii) controls the screen data save unit 16, the combination unit 17 and the printer I/F unit 21. Thus, the print control unit 19 is a CPU and the like, by performing the operations, for controlling to output print data compounded image displayed on the TV 4 at the time when the print instruction was received and the additional SI determined by the content of the additional SI identification table recording unit 20.

The additional SI identification table recording unit 20 is a memory and the like, the memory being on which a table for specifying a pair of additional SI and a print position thereof (additional SI specification table). The table is previously set or rewritten through a communication with a viewer. FIG. 3 is a diagram showing an example of an additional SI specification table stored in the additional SI specification table recording unit 20. In this example, it is specified to print a "channel" of a program on the left corner of header on the print paper 53, a "title" in the center position of header, and a "cast" in the center position of footer.

The printer I/F unit 21 is an interface circuit such as IEEE1394 and the like, the IEEE1394 reading out print data from a combination unit 17 when receiving a print out instruction from the print control unit 19 and transferring the readout print data to the printer apparatus 5 connected with a printer cable.

Next, the operation in the print system 1 structured as above described is explained.

Figure 4:
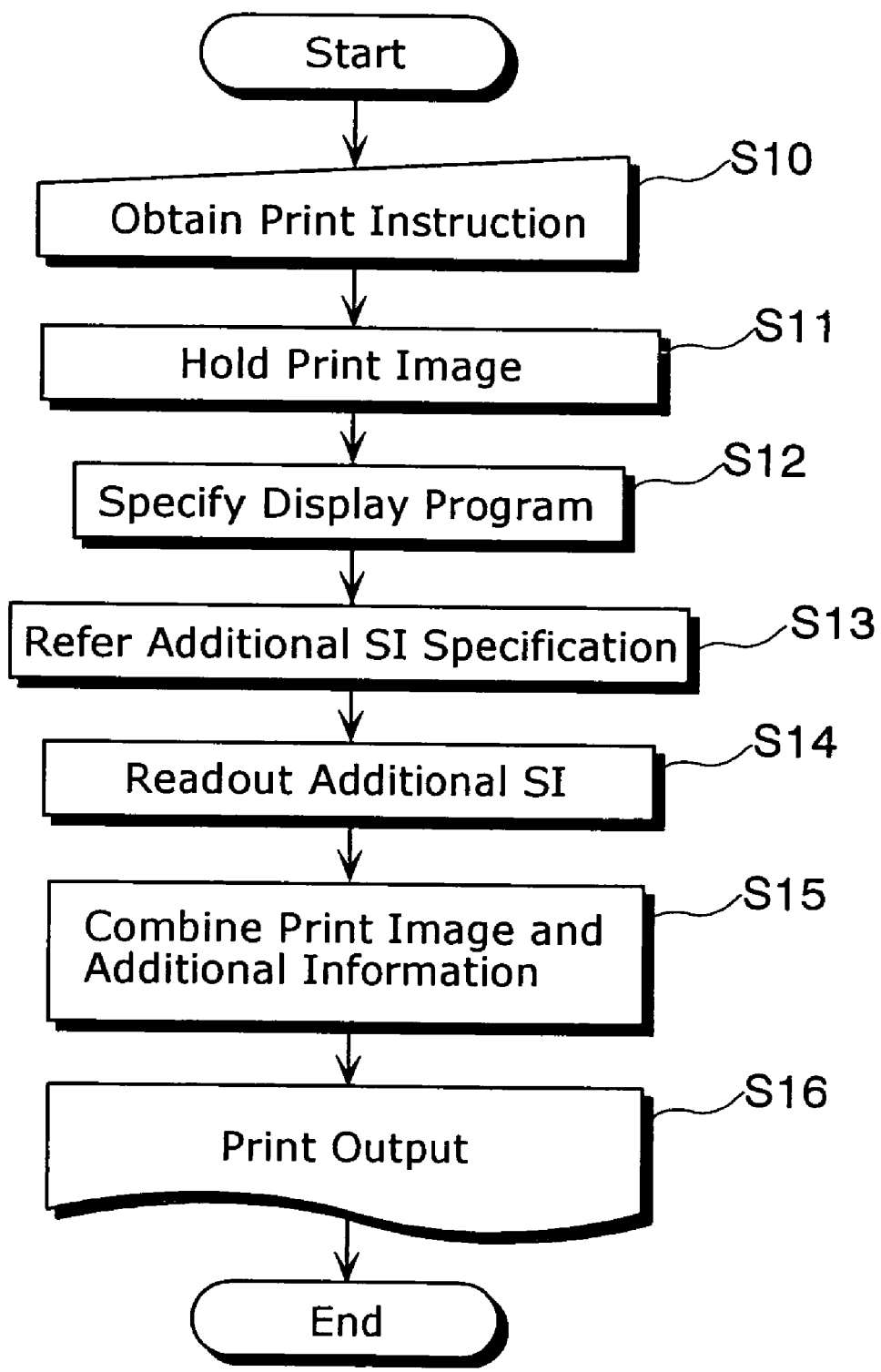
FIG. 4 is a flowchart showing print operations in the print system.

FIG. 4 is a flowchart showing a print operation in the print system 1.

Firstly, the print control unit 19 receives a print instruction sent by pushing a print only button and the like on the remote control 6 (Step S10), and keeps an image (a moving picture and data) displayed on the TV 4 at the time by notifying the instruction to the screen data save unit 16 (Step S11). Then, by reading out a display program ID stored in the display program ID recording unit 18, the print control unit 19 specifies a program displayed on the TV 4 at the time (Step S12) and specifies all additional SI and print positions thereof by reading out the additional SI specification table 20a recorded on the additional SI specification recording unit 20 (Step S13).

Next, the print control unit 19 reads out contents of all items (additional SI) specified in the additional SI specification table 20a readout from the additional SI specification table recording unit 20 out of the SI of programs indicated in the display program ID readout from the display program ID recording unit 18 (Step S14), and sends the readout additional SI and the information indicating its print position to the combination unit 17. For example, in the case where a display program ID "A1234" is stored in the display program ID recording unit 18 and the additional SI specification table 20a as described in FIG. 3 is stored in the additional SI specification table recording unit 20, the print control unit 19 i) searches a program ID of S114a stored in the SI storage unit 14, ii) specifies SI of the program with its program ID "A1234", iii) reads out additional SI (channel "BS123", title "Mt. Fuji and Man", and cast "Fujio Yamamoto") from the specified SI, and iv) sends the readout additional SI to the combination unit 17 with its print positions ("left to header", "center of header" and "center of footer").

The combination unit 17 generates print data by composing the additional SI and the image readout from the screen data save unit 16 based on the information indicating the additional SI sent from the print control unit 19 and the print positions. At this time, the additional SI is compounded to be printed on a position indicated by the print control unit 19 (Step S15). After completing the combination, the combination unit 17 reports to the print control unit 19 that the combination is completed.

The print control unit 19, which received the report that the combination was completed, causes a printer 5 to output the print data generated in the combination unit 17 via the printer I/F unit 21 (Step S16). In the printer 5 which received the print data, the printer controller 51 develops the additional SI to image data which is additional information such as header and footer by decoding the print data, considering the image indicated in the image data included in the print data. Then, the printer engine 52 prints out the image data on the print paper 53.

As the result, for example, in the case where a print instruction is sent while the program "Mt. Fuji and Man" with the program ID "A1234" is being watched, the image is printed out on the paper 53 by the printer apparatus 5. At the same time, the channel "BS123" of the program is printed on the left side of header on the paper 53; the title "Mt. Fuji and Man" is printed in the center of header on the paper 53; and the cast "Fujio Yamamoto" is printed in the center of footer on the paper 53.

Thus, a viewer can obtain a print output on which information (SI) relating to the program is added as header and the like on the hardcopy of an image of the program displayed when the viewer instructed to print using the remote control 6.

Next, a specific printing process and a print example for each type of broadcasting contents and broadcasting data received by the digital broadcasting receiving apparatus 3 are explained.

Figure 5:
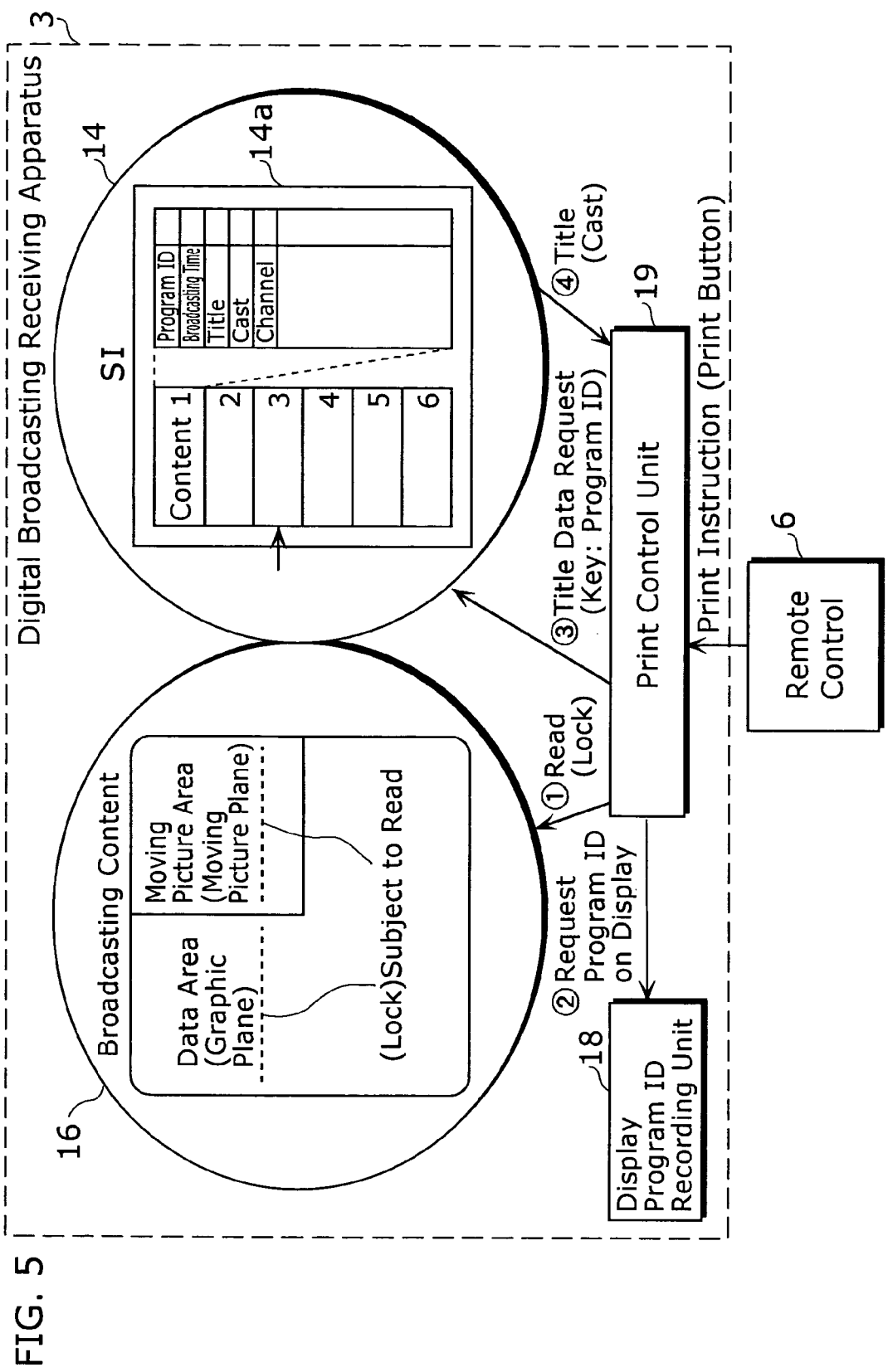
FIG. 5 is a diagram showing a generation process of print data in the case where the broadcasting content includes moving pictures and data broadcasting contents.

(1) In the Case Where Broadcasting Content Include Moving Pictures and Data Broadcasting Contents FIG. 5 is a diagram showing a generation process of print data in the case where broadcasting content includes moving pictures and data broadcasting contents. In this case, the print control unit 19 of the digital broadcasting receiving apparatus 3 i) receives a print instruction sent by pushing a print only button on a remote control 6, ii) reports the reception of the print instruction to the screen data save unit 16, iii) holds (lock) a moving picture displayed on the TV 4 at the point, that is moving picture plane and graphic plane (data such as still pictures and texts and the like which displayed via data broadcasting) (①in FIG. 5), iv) reads out a display program ID recorded in the display program ID recording unit 18, and v) specifies a program displayed on the TV 4 at that moment (② in FIG. 5). Then, the print control unit 19 i) specifies an item of additional SI (for example, "title" of a "program" etc.) with reference to an additional SI specification table 20a stored in the additional SI specification table recording unit 20, and ii) reads out contents of the additional SI (for example, "Mt. Fuji and Man" etc.) out of the SI indicated by the display program ID from the SI storage unit 14 (④ in FIG. 5). After that, the additional SI readout to the print control unit 19 and the image held in the screen data save unit 16 are combined at the combination unit 17, transferred to the printer apparatus 5 and printed out.

Figure 6:
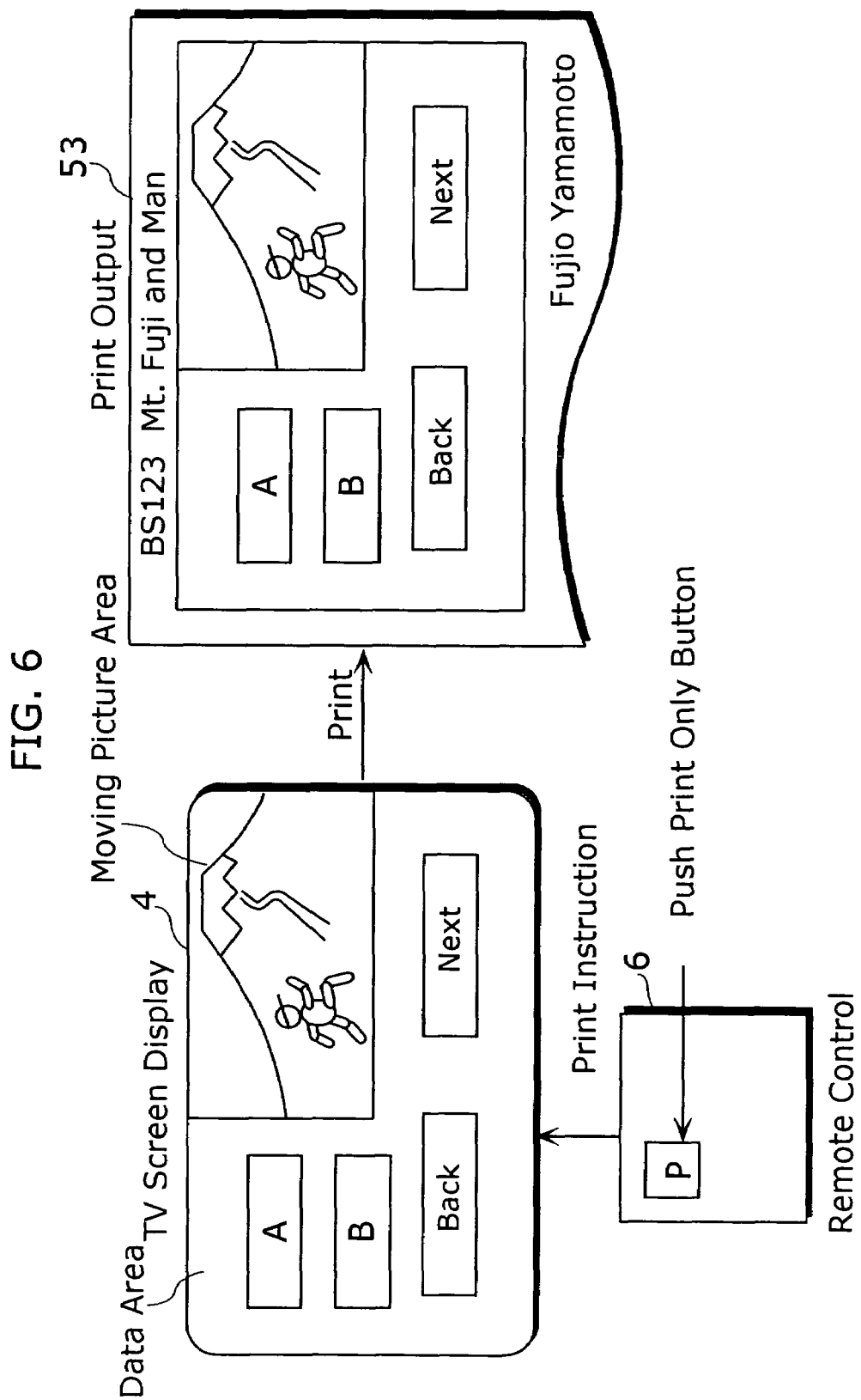
FIG. 6 is a diagram showing a relationship of a display on a TV and a print output at a printer apparatus in the case where the broadcasting content includes moving pictures and broadcasting contents.

FIG. 6 is a diagram indicating a relationship of a display on a TV 4 with a print output by the printer 5 in the case where broadcasting content includes moving pictures and the data broadcasting contents. Suppose a print instruction is sent by pushing a print only button and the like on a remote control 6 when a still picture and characters are displayed in a data area in figure L-type display and moving pictures of a program in a moving picture area are displayed on a TV 4 screen. Then, a control process indicated in FIG. 5 is executed and the image of the program shown at the time when the print instruction was sent (a hardcopy in which a pictures in the moving picture area and a picture in the data area are coexisted) is printed in the center of the print paper 53, and the title of the program and the like are printed in header and the like of the print paper 53.

Note that the print control unit 19 can send the additional SI readout from the SI storage unit 14 together with its item name when the print control unit 19 sends the additional SI.

As a result, for example, "title: Mt. Fuji and Man" is printed in header of the print paper 53, replacing to the printed characters "Mt. Fuji and Man".

While the print body is processed as screen image data in this case, the print body can be a document written in markup language. In general, the data broadcasting content is a document data written in markup language. The markup language includes XML markup language such as BML or HTML (Hyper-Text Markup Language). Thus, moving pictures and data broadcasting content can be brought together to one print body as a markup document. In the case where the print body is written as the markup document, the screen data storage unit 16 stores, into the buffer memory, not an image of graphic plane but the data broadcasting content as the markup language. Furthermore, in the combination process of a print body at the combination unit 17, a still picture which is combined of 1 frame of moving pictures in a frame buffer is converted to a JPEG data and the like as image element, the image element is inserted into a predetermined place of the data broadcasting content which is a markup document. In this case, it is efficient to make the print data generated by being combined with the additional SI as markup document.

Note that, a method of composing additional SI information as "header information" and "footer information" would be better to be realized as "header element" and "footer element" as shown in XHTML-Print (a markup language for extending XHTML-Basic for printing which has been developed) and the like. Accordingly, header information and footer information can be included in a markup document. Certainly, in this case, a printer controller 51 of the printer apparatus 4 decodes and rasterizes a markup document since the print data is a markup document.

The advantages of making the print data and the print body as the markup document as in this case are, as compared to a development screen image, that a data size can be smaller and the like since the markup language is text data. Therefore, the size of buffer memory in the screen data storage unit 16 all requires a small size. In addition, it is also an advantage that a data transferring time to the printer apparatus is shortened.

(2) In the Case Where Broadcasting Content Includes Only Moving Pictures

Figure 7:
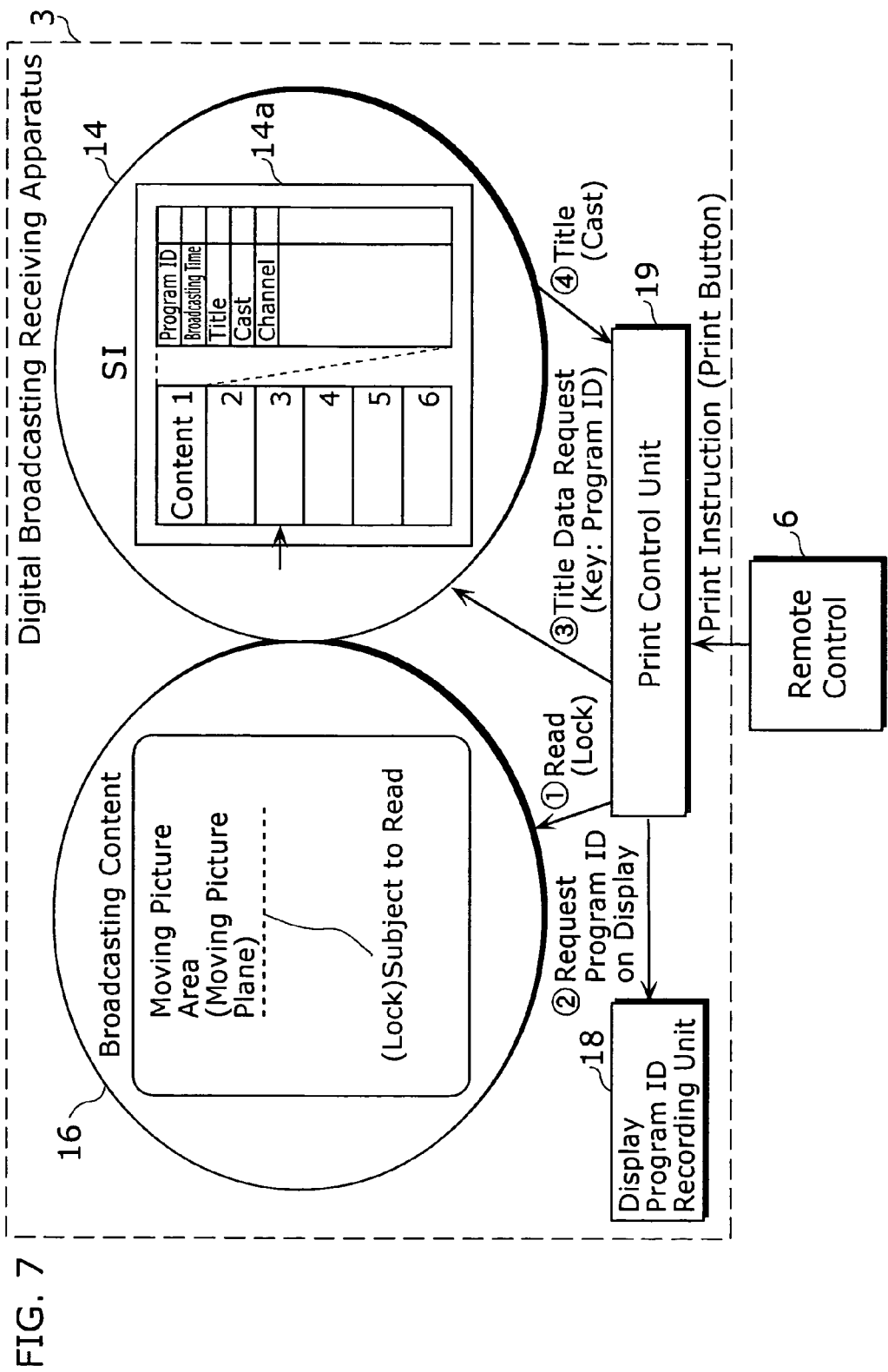
FIG. 7 is a diagram showing a generation process of print data in the case where the broadcasting content only includes moving pictures.

FIG. 7 is a diagram indicating a generation process of print data in the case where broadcasting content includes only moving pictures. In this case, the print control unit 19 of the digital broadcasting receiving apparatus 3 receives a print instruction sent by pushing a print only button on a remote control 6, reports the reception to the screen data storing unit 16, in other words, after locking the moving picture plane that is an image displayed on the TV 4 at the time (①in FIG. 7), reads out a display program ID recorded in a display program ID recording unit 18, and specifies a program displayed on the TV at that moment (②FIG. 7). After specifying an item of the additional SI, the print control unit 19 reads out contents of the additional SI out of SI indicated in the display program ID with reference to an additional SI specification table 20a stored in the additional SI specification table recording unit 20 (④in FIG. 7). Then, the additional SI readout by the print control unit 19 and an image held in the screen data save unit 16 are combined in the combination unit 17, transferred to the printer 5 and printed out.

Figure 8:
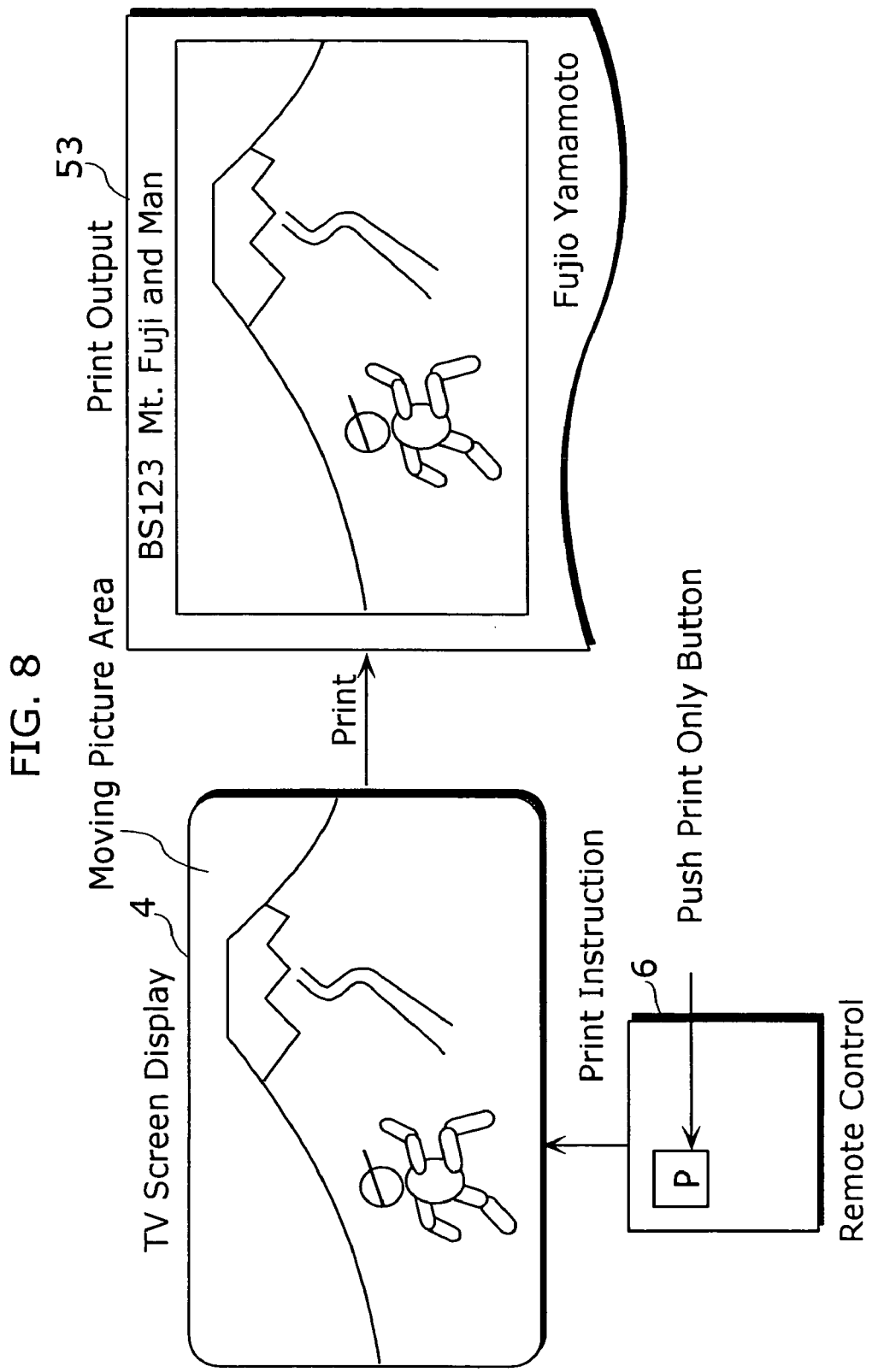
FIG. 8 is a diagram showing a relationship of a display on the TV with a print output at the printer apparatus in the case where the broadcasting content only includes moving pictures.

FIG. 8 is a diagram showing a relationship of a display on the TV 4 with a print output by the printer apparatus 5 in the case where the broadcasting content includes only moving pictures. Suppose a print instruction is sent by pushing a print only button on a remote control 6 when a moving picture of a program is displayed on a screen of the TV 4. Then, the control process indicated in FIG. 7 is executed and the printer apparatus 5 prints an image of the program at the time when the print instruction was sent (a hardcopy of the moving picture) in the center of a print paper 53, and prints a title and the like of the program in header and the like of the print paper 53.

Note that, in this case, the broadcasting signal does not need to include data broadcasting contents. Therefore, it is needless to say that this process can be applied not only to a digital broadcasting but also to an analog broadcasting. That is, in the analog broadcasting, the same result as a print example in FIG. 8 can be obtained by the analog broadcasting receiving apparatus which has a same print control function as that of the present digital broadcasting receiving apparatus 3, the analog broadcasting sending a program and additional information such as SI.

In addition, while the print body is processed as screen image data in the present invention, as in "(1) in the case where broadcasting content includes moving pictures and data broadcasting contents", the print body can be a document written in markup language. Since this case does not include data broadcasting contents, there is no process of composing the print body from data broadcasting contents and moving pictures. Other than that, it is the same as "(1) in the case where broadcasting content includes moving pictures and data broadcasting contents".

Figure 9:
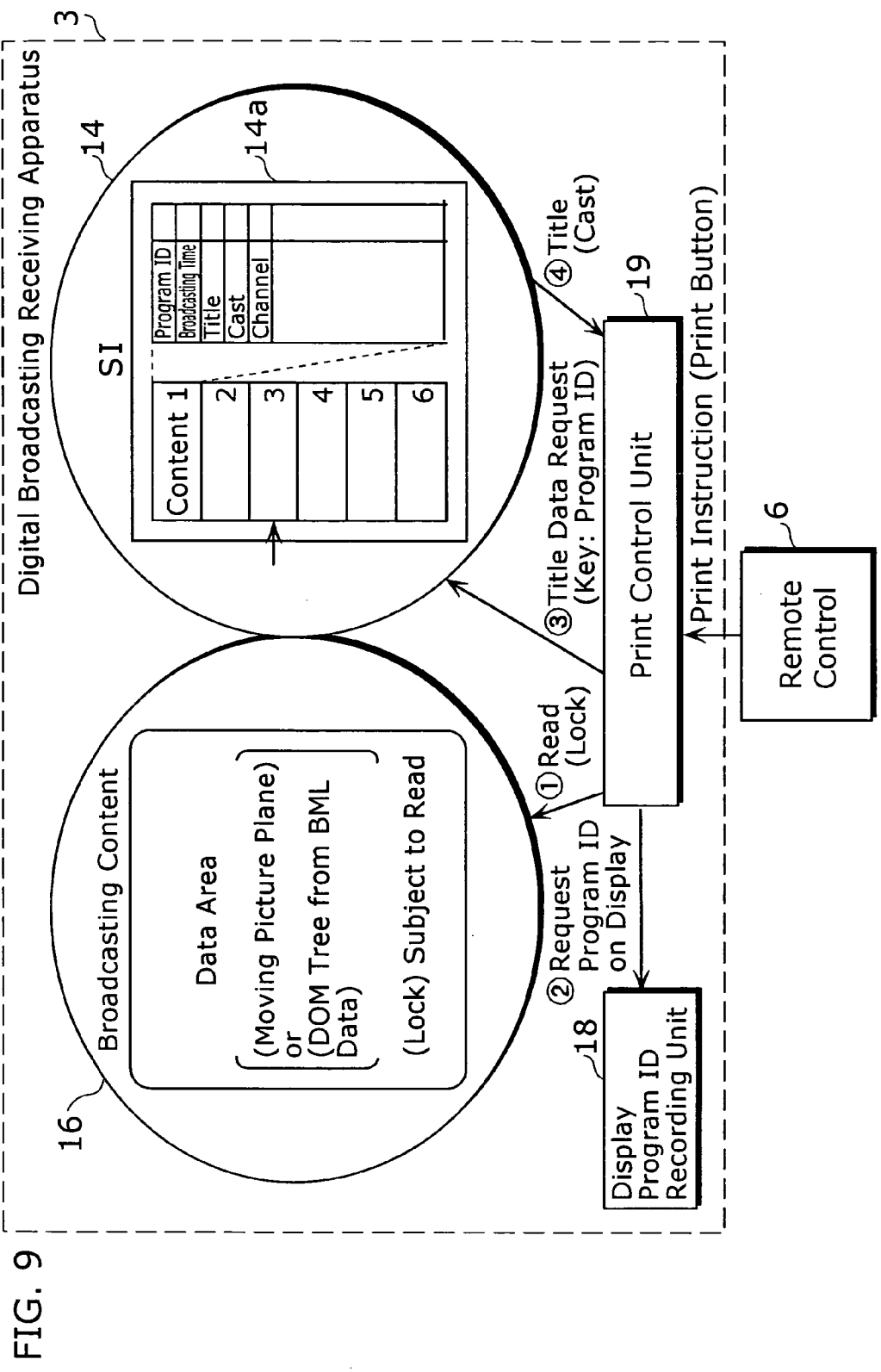
FIG. 9 is a diagram showing a generation process of print data in the case where the broadcasting content only includes data broadcasting content.

(3) In the Case Where Broadcasting Content Includes Only Data Broadcasting Contents FIG. 9 is a diagram of indicating a process of generating print data in the case where broadcasting content includes only data broadcasting contents. In this case, the print control unit 19 of the digital broadcasting receiving apparatus 3 i) receives a print instruction sent by pushing a print only button on a remote control 6, ii) reports the reception to the screen data save unit 16, iii) holds (locks) the image displayed on the TV 4 at the time, that is, the data broadcasting content (①in FIG. 9), iv) reads out a display program ID being recorded in the display program ID recording unit 18, and v) specifies a program displayed on the TV 4 at the time (②in FIG. 9). Then, the print control unit 19 specifies an item of the additional SI (for example, program "title" etc.) and reads out the content of the additional SI from the SI storage unit 14 out of SI indicated by the display program ID with reference to an additional SI specification table 20a stored in the additional SI specification table recording unit 20 (④in FIG. 9). After that, the additional SI readout by the print control unit 19 (for example, "Naniwa Local Information" etc.) and an image held in the screen data save unit are combined at the combination unit 17, transferred to the printer apparatus 5 and printed out.

In here, the digital broadcasting receiving apparatus 3 according to the present embodiment, can deal with BML document data, HTML document data and the like as a method of expressing data broadcasting content, and with XHTML-Print as a print data format for outputting to the printer apparatus 5. That is, converting a BML document and a HTML document to be sent as data broadcasting content into XHTML-Print is necessary. In this case, it is rational to write the print body in markup language. It is because that the print body consists of only data broadcasting contents that are markup document data.

In this case, while there is no process for composing print data since there is no moving picture, other processes are same as in "(1) In the case where broadcasting content includes moving pictures and data broadcasting contents". Note that, it does not need to be markup document data to be stored in a buffer memory of the screen data save unit 16. The data broadcasting processing unit 13 may convert the markup document data into an internal data structure called DOM (Document Object Model defined by WWW Consortium) tree and stores the converted data into the screen data save unit 16. In here, it is necessary to convert the DOM tree into the markup document data when print data is combined at the combination unit 17.

Figure 10:
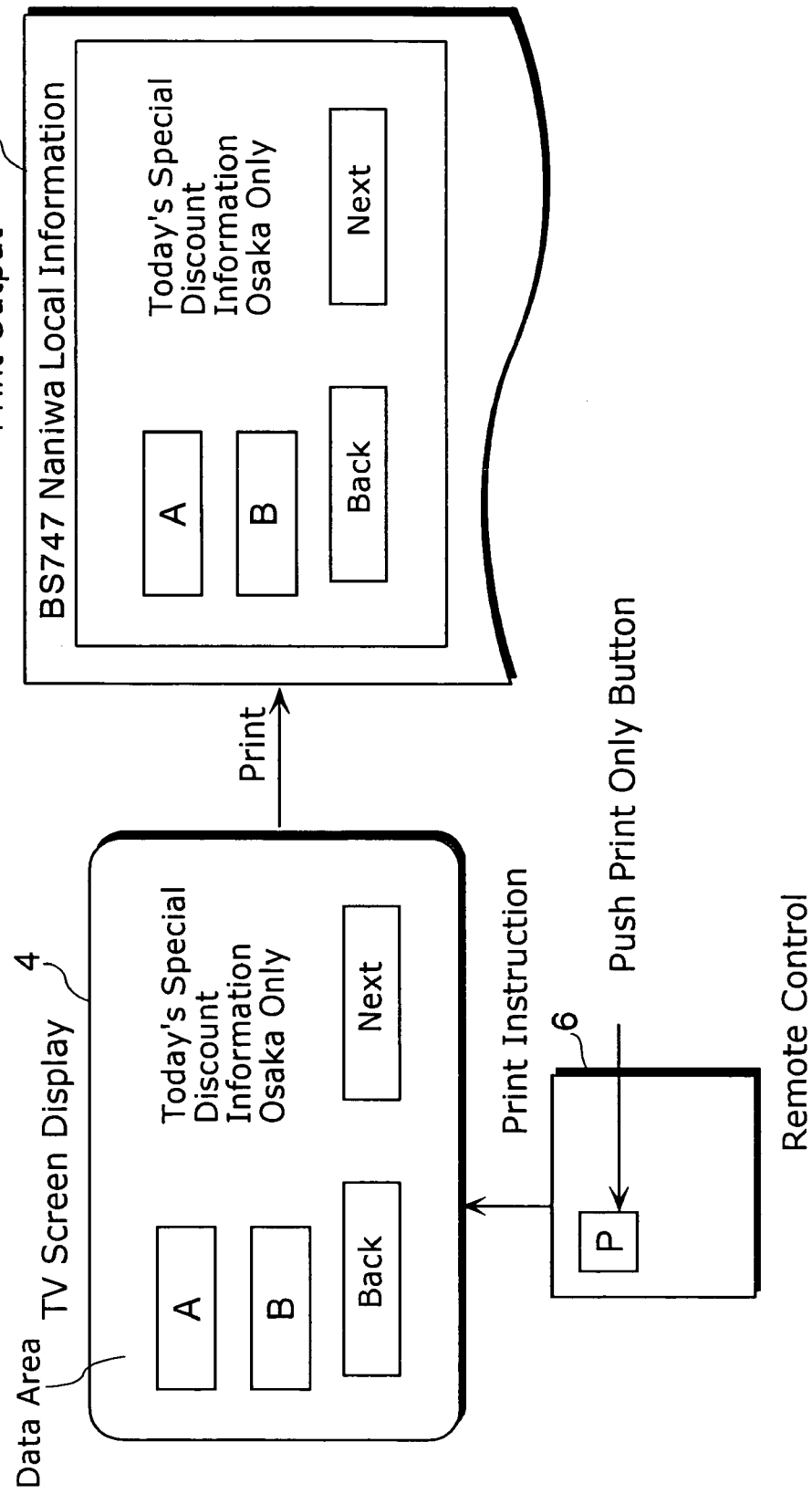
FIG. 10 is a diagram showing a relationship of a display on the TV and a print output at the printer apparatus in the case where the broadcasting content only includes data broadcasting content.

FIG. 10 is a diagram showing a relationship of a display on the TV 4 with a print output at the printer apparatus 5 in the case where the broadcasting content includes only the data broadcasting contents and the data broadcasting contents are printed by a unit of BML page (the print type is a hard copy of a screen). Suppose a print instruction is sent by pushing a print only button on a remote control 6 at the time when a program of a data broadcasting is displayed on a screen of the TV 4. Then, the control process indicated in FIG. 9 is executed, the image of a program (a screen hard copy) at that moment when the print instruction was sent is printed in the center of a print paper 53 and a title of the program and the like are printed in header and the like on the print paper 53 by the printer apparatus 5.

Figure 11:
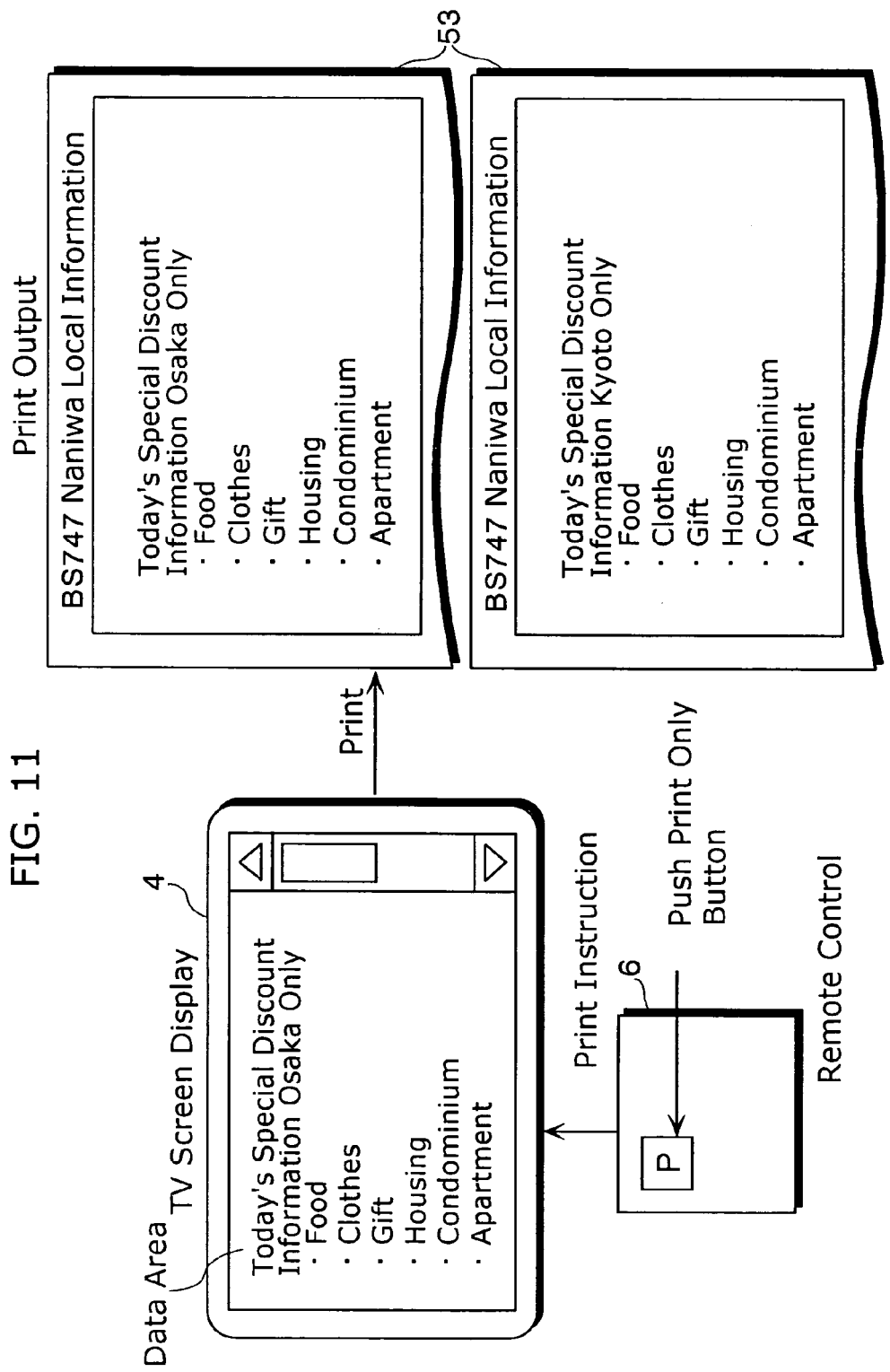
FIG. 11 is a diagram showing a relationship of a display on the TV and a print output at the printer apparatus in the case where the broadcasting content only includes data broadcasting content and printed by a unit of a HTML page.

FIG. 11 is a diagram showing a relationship of a display on the TV 4 with a print output at the printer apparatus 5 in the case where the broadcasting content includes only data broadcasting contents and the data broadcasting contents are printed by a HTML page. Suppose a print instruction is sent by pushing a print only button on a remote control 6 when a program of a data broadcasting is displayed on a screen of the TV 4. Then, the control process indicated in FIG. 9 is executed and a HTML page in association with an image displayed at the time when the print instruction was sent. In here, a display content of one HTML page which includes display contents for two screens is separately printed on two print papers 53, and a title of the program and the like are printed respectively in header and the like on the two print papers 53.

(4) In the Case Where Broadcasting Data Includes Print Only Data

Figure 12:
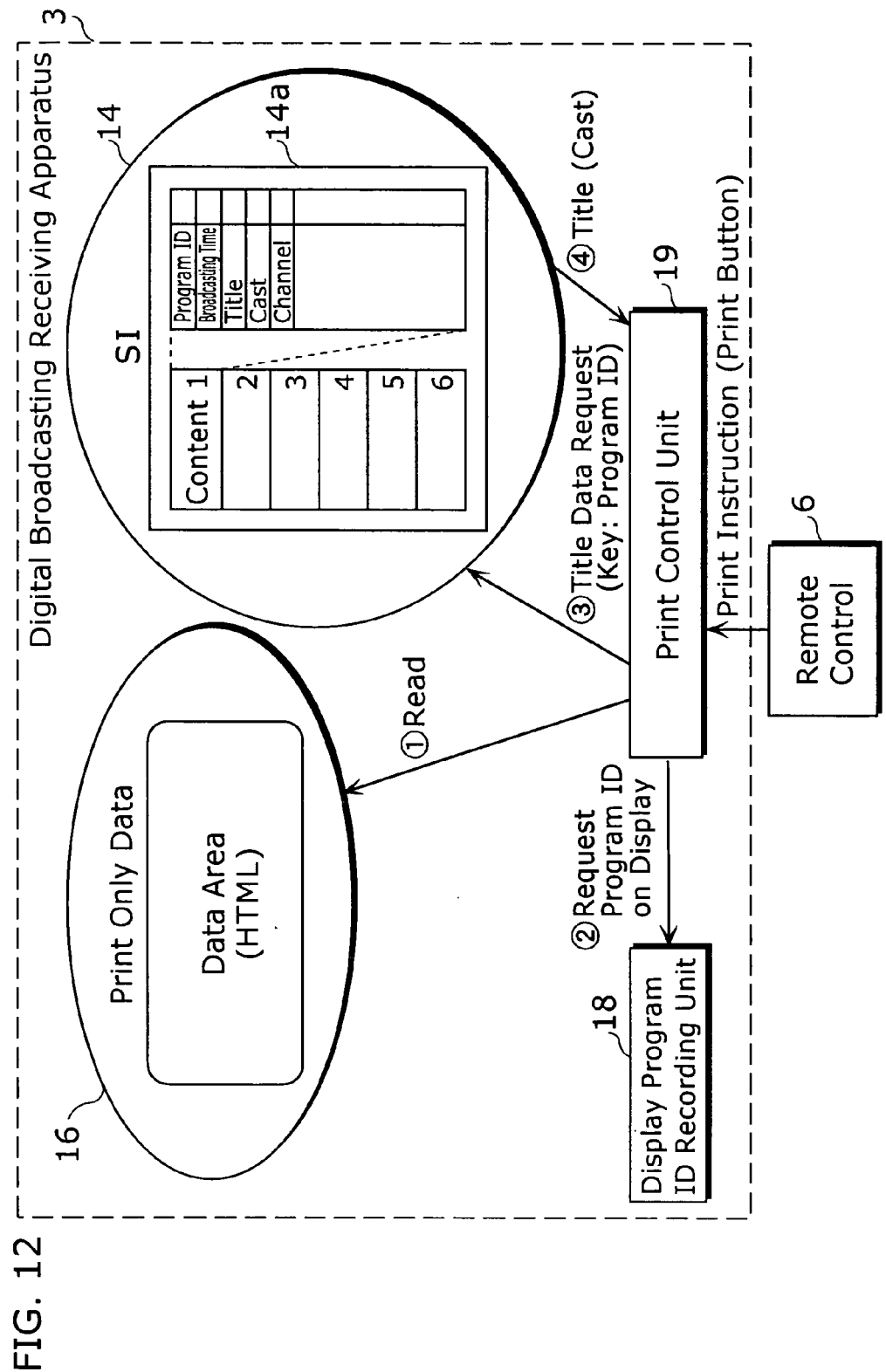
FIG. 12 is a diagram showing a generation process of print data in the case where the broadcasting data include print only data.

FIG. 12 is a diagram showing a generation process of print data in the case where broadcasting data includes print only data. Note that, the print only data are data designed for printing to be sent from a broadcasting station with the image data, the print only data being multiplexed in a stream of data broadcasting as an information table which has a specified identification ID. The print only data, for example is written in XHTML-Print, and used for sending a long-form text and the like that are applicable to a print output than a display output.

In this case, the print control unit 19 of the digital broadcasting receiving apparatus 3 i) receives a print instruction sent by pushing a print only button on a remote control 6, ii) reports the reception to the screen data save unit 16, iii) holds (lock) the print only data (print only data separately extracted at the data broadcasting processing unit) related to a program displayed on the TV 4 at the time (①in FIG. 12), iv) reads out a display program ID recorded in the display program ID recording unit 18, and v) specifies a program displayed on the TV 4 at that moment. Then, the print control unit 19 specifies an item of the additional SI and reads out the content of the additional SI from the SI storage unit 14 out of SI indicated by the display program ID with reference to an additional SI specification table 20a stored in the additional SI specification table recording unit 20 (④ in FIG. 12). After that, the additional SI readout by the print control unit 19 and the print only data held in the screen data save unit 16 are combined at the combination unit 17, transferred to the printer apparatus 5 and printed out.

Figure 13:
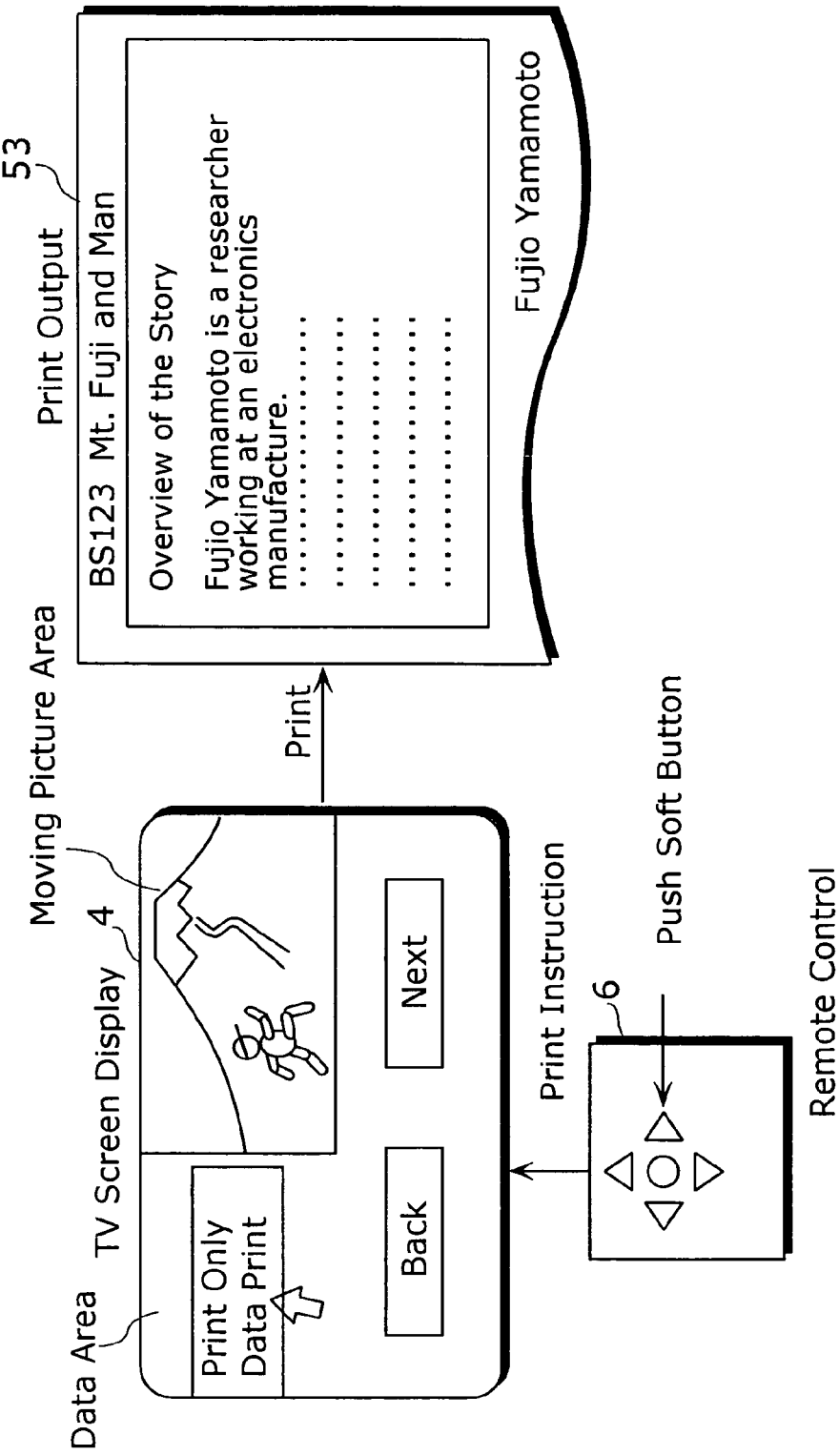
FIG. 13 is a diagram showing a relationship of a display on the TV and a print output at the printer apparatus in the case where the broadcasting data include print only data.

FIG. 13 is a diagram showing a relationship of a display on the TV 4 with a print output at the printer apparatus 5 in the case where the broadcasting data includes print only data. Suppose an operation of pushing a soft button "print only data print" displayed on a screen of the TV 4 is performed by an arrow button and the like on a remote control 6, when the soft button "print only data print" for instructing to print the print only data together with still pictures and the like on a data area is displayed and the moving pictures of a program in a moving picture is displayed on a screen of the TV 4 by the figure L-type display. Then, the control process indicated in FIG. 12 is executed and the print only data (for example, a text which describes an outline of a program and the like) is printed in the center of the print paper 53, and a title and the like of the program are printed in header and the like on the print paper 53, the print only data being sent in association with a program displayed at the time when the print instruction was sent.

Accordingly, while watching a TV 4, a viewer can obtain detailed additional information related to the program and the like (an outline etc.) without disturbing a display of a program that the viewer is watching, by pushing the soft button displayed on a screen.

Note that, also in this case, a hard copy of a display screen of the TV 4 can be obtained as well as above mentioned cases (1)~(3) when the print only button of a remote control 6 is pushed. Not by switching a subject to be printed by a hard button or a soft button, the same result can be obtained by deliberately using two types of special buttons set on a remote control 6.

Furthermore, in this case, it is rational to write the print body in markup language. It is because that the print body is combined of only the data broadcasting content which is the markup document data. This case is same as in the case where the print body is described in markup language as in "(3) In the case where the broadcasting content includes only the data broadcasting contents".

As described above, according to the present embodiment, in any case where each type of data is sent as the broadcasting content, a viewer can obtain a convenient print output to which added, as header and the like, information related to a program (SI) together with an image of the program displayed on the TV 4 at the time when the viewer sent a print instruction using a remote control 6. Therefore, the viewer does not need to write down a memo such as program name on an outputted print paper.

While, in the present embodiment, "program ID", "broadcasting time", "title", "casts", "channel" and the like are described as program information, these can be also described as "program outline". There is a possibility that the "program outline" can be in a long-form. In that case, the "program outline" can be printed on the half of the page of a print paper as in FIG. 25 which is described later.

Furthermore, in the present embodiment, a print only button is set on a remote control 6 and a print instruction is sent using the button. It is sufficient if a print instruction can be sent from a remote control 6 by using any means without setting a print only button. For example, an action of holding another button such as a data download button or a four color button down for predetermined time or more can be an action of sending a print instruction.

Second Embodiment

Figure 14:
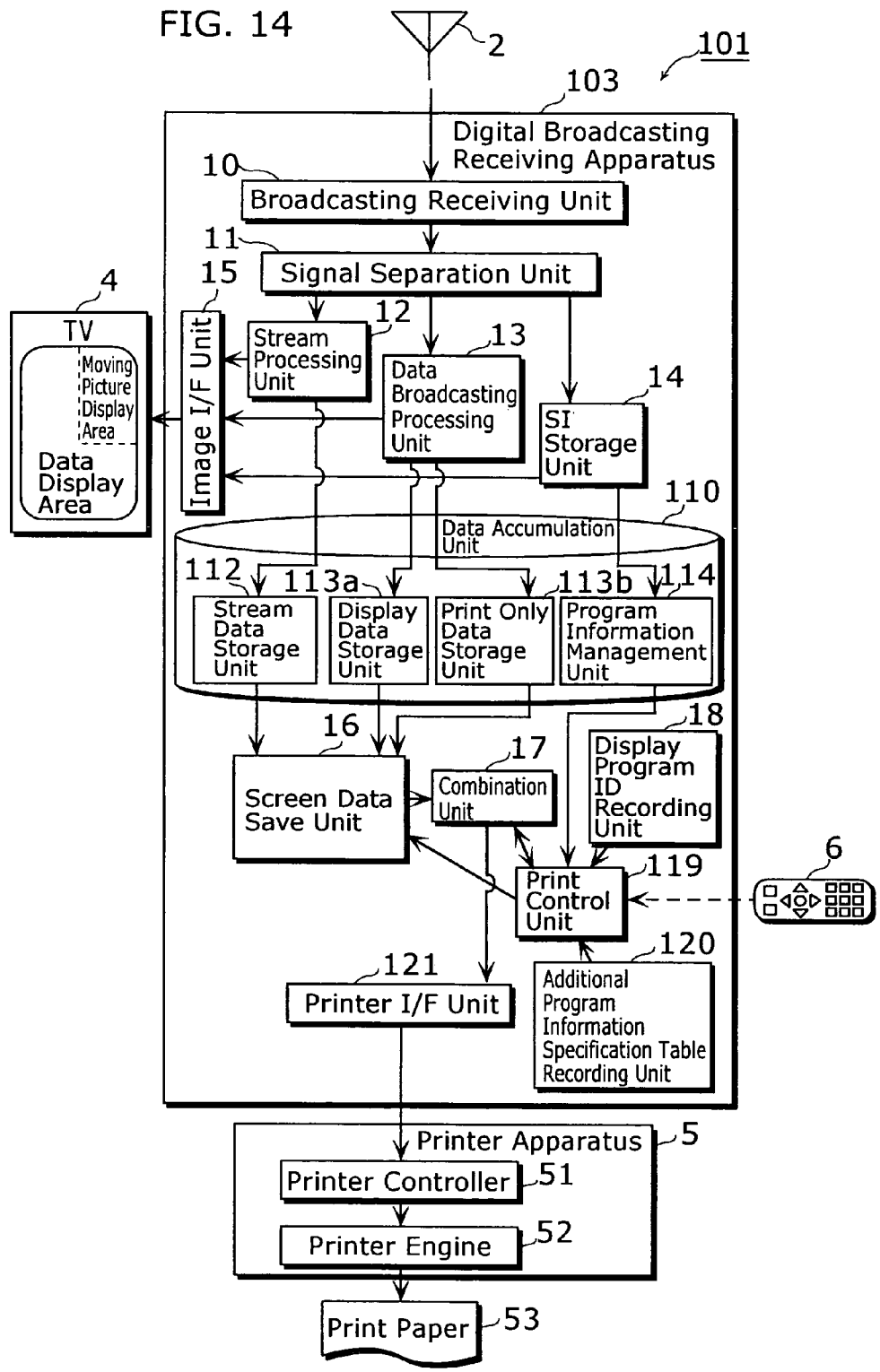
FIG. 14 is a functional block diagram showing a configuration of a print system according to a second embodiment of the present invention.

FIG. 14 is a functional diagram showing a configuration of a print system 101 according to second embodiment of the present invention. The print system 101 is a system to print accumulation data. That is, the print system 101 has in common with the first embodiment in that it is a system capable of printing images and the like displayed on a TV screen together with additional information such as program name and the like. On the other hand, the print system 101 differs with the first embodiment in that it generates print data from accumulation data which has been received and accumulated in a receiving apparatus, the print system 101 comprising an antenna 2, a digital broadcasting receiving apparatus 103, a TV 4, a printer apparatus 5 and a remote control 6.

The digital broadcasting receiving apparatus 103 has a digital broadcasting receiving apparatus 3 of the first embodiment to which a broadcasting data accumulation unit 110 is added, the broadcasting data accumulation unit includes a stream data storage unit 112, a display data storage unit 113a, a print only data storage unit 113b and a program information management unit 114. Also, the digital broadcasting receiving apparatus 103 has an additional program information specification table recording unit 120 replacing the additional SI specification table recording unit 20. Note that, same marks are given to the same constituents as in first embodiment. Therefore, explanations for those constituents are omitted.

The broadcasting data accumulation unit 110 is a build-in HDD and the like. Based on an instruction from a viewer and the like, the broadcasting data accumulation unit 110 accumulates and stores the broadcasting data of programs received by the digital broadcasting receiving apparatus 103. Further, the broadcasting data accumulation unit 110 includes a stream data storage unit 112, a display data storage unit 113a, a print only data storage unit 113b, and a program information management unit 114, the stream data storage unit 112 storing stream data such as moving pictures decoded and generated at the stream processing unit 12, the display data storage unit 113a storing data broadcasting content such as still pictures and characters decoded and generated at the data broadcasting processing unit 13. The print only data storage unit 113b stores print only data separately extracted at the data broadcasting processing unit 13, and the program information management unit 114 records program information which becomes an index for specifying data, by a program, stored in above mentioned three storage units 112, 113a and the 113b.

Figure 15:
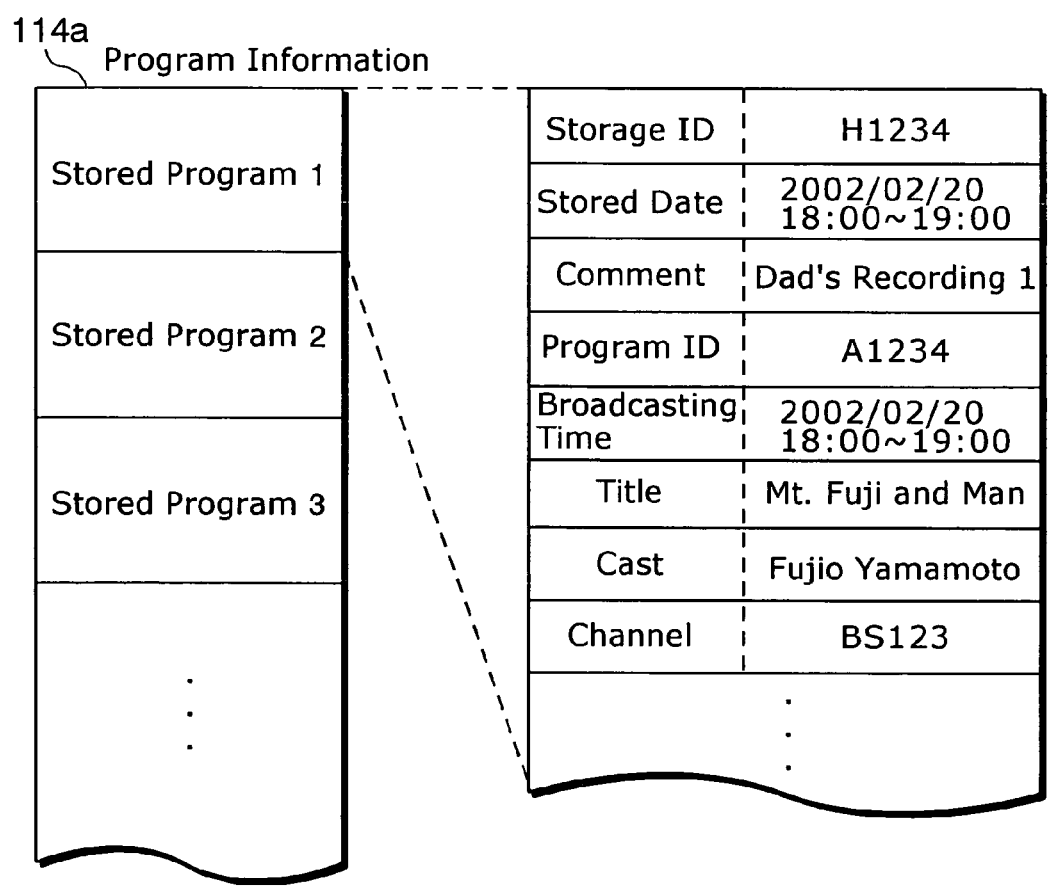
FIG. 15 is a diagram showing an example of program information stored in a program information management unit of the broadcasting data accumulation unit in a digital broadcasting receiving apparatus.

FIG. 15 is a diagram showing an example of program information 114a stored in the program information management unit 114 of the broadcasting data accumulation unit 110. The program information 114a is a collection of "storage ID", "storage date", "comment" "program ID" "broadcasting time", "title", "cast" "channel" and the like for each program (content) stored in the three storage units 112, 113a and 113b. Here, the "storage ID" is a number for identifying a program accumulated in the broadcasting data accumulation unit 110; the "storage date" is a date when the program is stored in the broadcasting data accumulation unit 110; and both of the "storage ID" and the "storage date" are recorded by the broadcasting data accumulation unit when the program is accumulated. The "comment" is a text inputted by a viewer using a remote control 6 and the like. The "program ID" "broadcasting time", "title", "cast", "channel" and the like are readout from SI 14a stored in the SI storage unit 14 by the program information management unit 114.

The additional program information specification table recording unit 120 is a memory and the like on which a table (an additional program information specification table) for specifying a pair of additional program information with the print position, the additional program information specification table recording unit 120 being set or rewritten, in advance, according to a communication with a viewer. Here, the additional program information specification table is associated with an additional SI specification table in the first embodiment, the additional program information specification table including what specified to be printed (for example, a storage date of a program etc.) out of the program information recorded in the program information management unit 114.

FIG. 16 is a diagram showing an example of an additional program information specification table 120a stored in the additional program information specification table recording unit 120. In this example, it is specified to print a "storage date" of a program to be printed on the left side of the header on the print paper 53, a "comment" in the center of the header, and the "title" in the center of the footer.

In the present embodiment, the display program ID recording unit 18 stores an ID for specifying a program displayed on the TV 4, that is, a storage ID for specifying a program selected by a viewer to playback out of the programs accumulated in the broadcasting data accumulation unit 110. The "storage ID", for example, is a storage ID in association with a program selected by a viewer using a remote control 6 to the program information 114a displayed on the TV 4.

As described above, the operations of the print system 101 in the present embodiment is basically same as that of the print system 101 in the first embodiment. The different point is that the content to be printed (stream data such as moving pictures, data broadcasting contents, print only data, and additional program information) is stored in the broadcasting data accumulation unit 110, that is, the content specified by a viewer to playback out of the programs accumulated in the broadcasting data accumulation unit 110.

In other words, the print control unit 119 reads out the contents of all items (additional program information) from the program information management unit 114 and sends the readout additional program information and information indicating the print positions to the combination unit 17, the contents of all items being specified at the additional program information specification table 120a readout from the additional program information specification table recording unit 120 out of the program information of the program indicated by the storage ID readout from the display program ID recording unit 18.

The screen data save unit 16 i) receives a notice from the print control unit 19 that a viewer sent a print instruction, ii) reads out an image to be displayed at a moment from a buffer in the stream processing unit 12 and the data broadcasting processing unit 13 or a storage units 112 and 113a, the image being stream data readout from the stream data storage unit 112 and a data broadcasting content readout from the display data storage unit 113a, and iii) temporally holds the readout image as image data to be printed. Further the screen data save unit 16 reads out print only data in association with a program displayed at the time from the print only data storage unit 113b when receiving a print instruction of the print only data by pushing a soft button and the like.

The combination unit 17 generates a print data by composing additional program information with images readout from the screen data save unit 16 (stream data of moving pictures, data broadcasting content) or print only data, based on additional program information and the information indicating the print position sent from the print control unit 119.

It is same as in the first embodiment that the generated print data is sent to the printer apparatus 5 via the printer I/F unit 21 and printed on the print paper 53.

Figure 17:
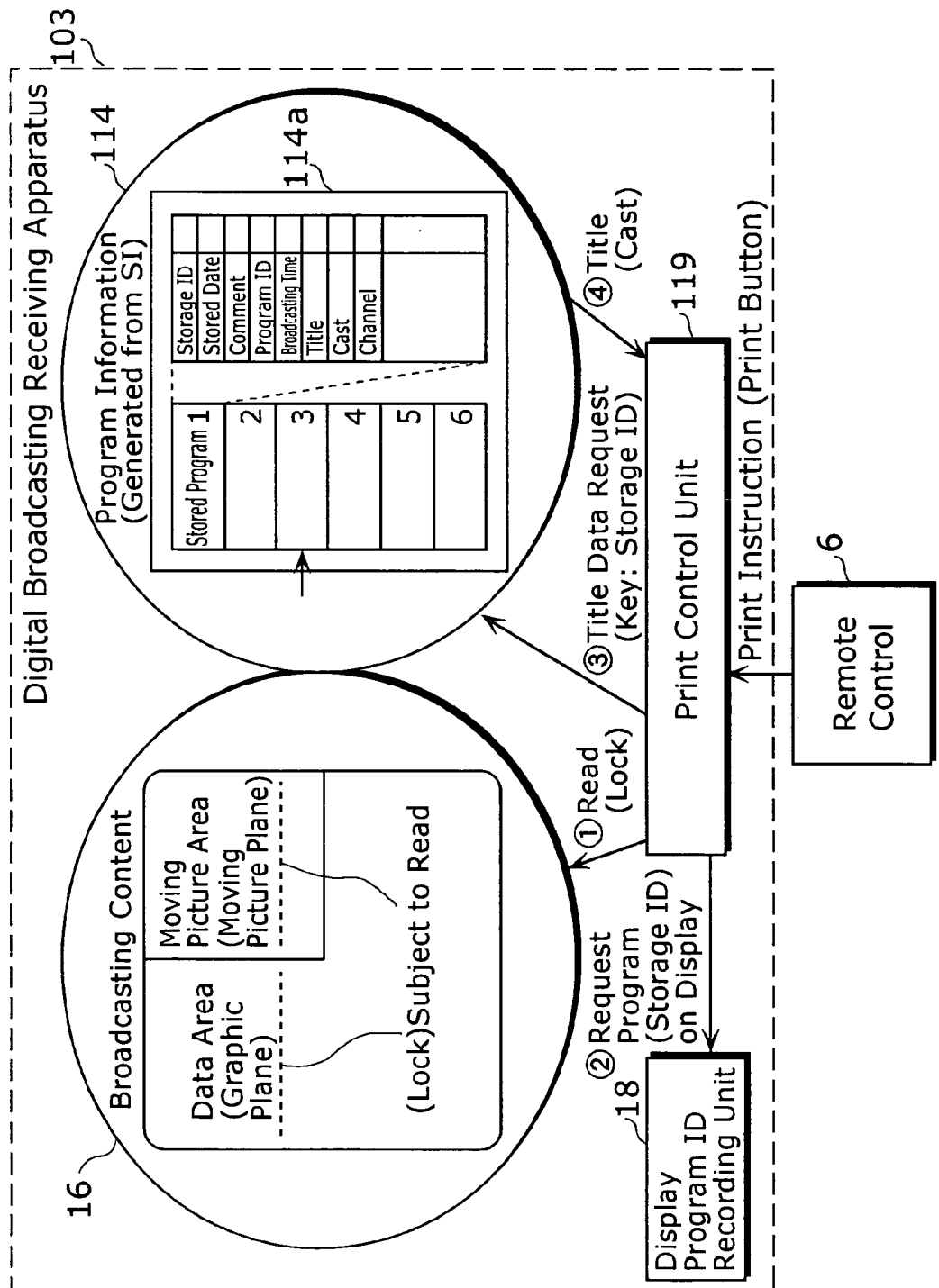
FIG. 17 is a diagram showing a generation process of print data in the case where the broadcasting content includes moving pictures and data broadcasting content.

FIG. 17 is a diagram indicating a generation process of print data in the case where the broadcasting content includes moving pictures and data broadcasting content, corresponding to FIG. 5 in the first embodiment. In the first embodiment, the additional SI to be printed is readout from the SI 14*a* stored in the SI storing unit. On the other hand, in the present embodiment, the additional program information to be printed is readout from the program information 114*a* stored in the program information management unit 114 (③, ④ (in FIG. 17).

For example, in the case where a storage ID "H1234" is stored in the display program information specification table recording unit 120 and the additional program information specification table 120*a* as in FIG. 16 is stored in the additional program information specification table recording unit 120, the print control unit 119 i) searches a storage ID of the program information 114*a* stored in the program information management unit 114, ii) specifies a SI of a program whose storage ID is "H1234", iii) reads out additional SI (the storage date "2002/02/20 18:00~19:00", the comment "Dad's recording 1" and the title "Mt. Fuji and the man") from the SI, and iv) sends the additional SI together with the print positions ("left to header", "center of header", and "center of footer") to the combination unit 17.

Figure 18:
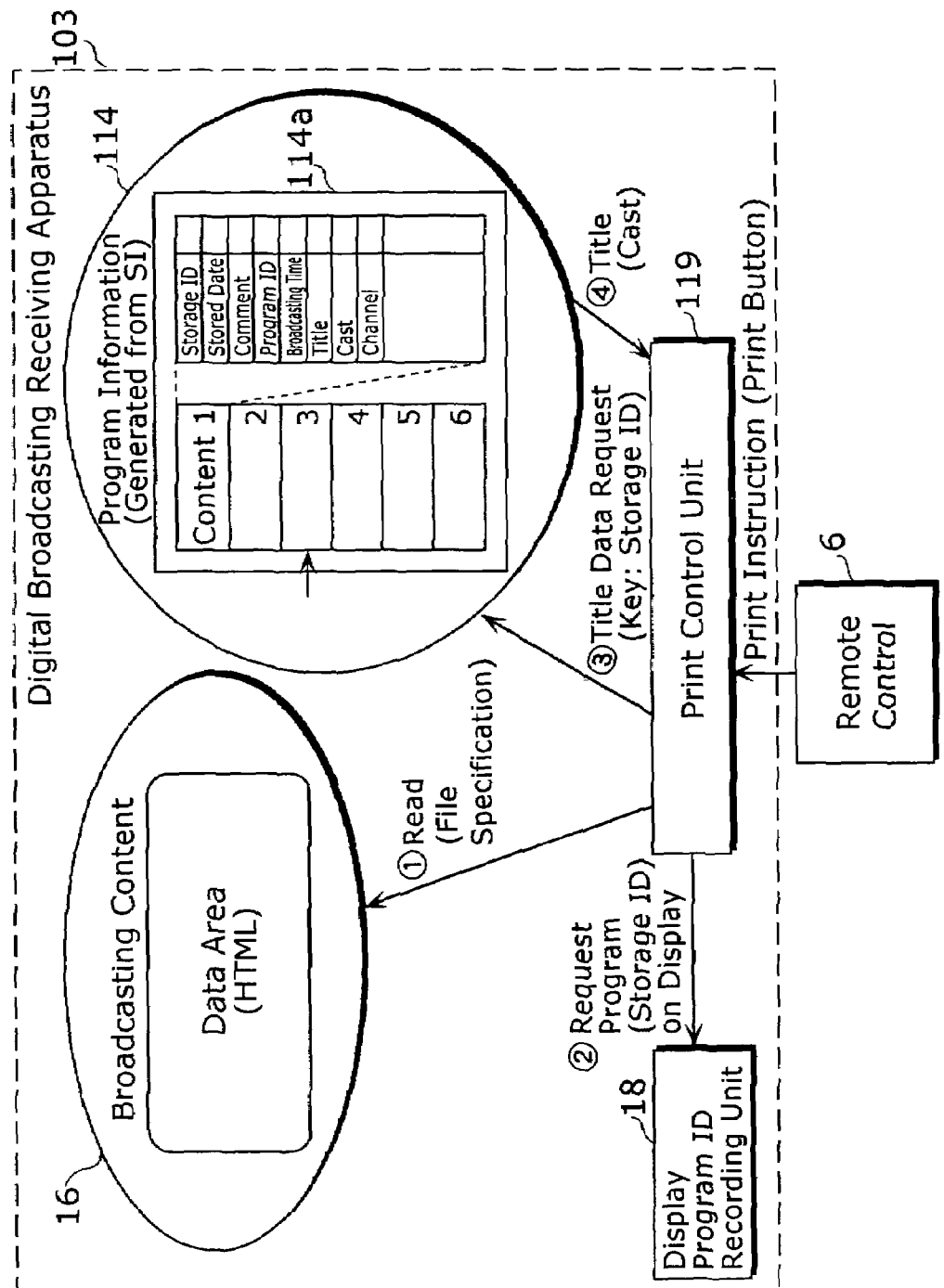
FIG. 18 is a diagram showing a generation process of print data in the case where the broadcasting data include print only data.

FIG. 18 is a diagram indicating a process of generating print data in the case where the broadcasting data includes the print only data, corresponding to FIG. 12 in the first embodiment. In this case, it differs that additional program information to be printed is readout from the program information 114*a* stored in the program information management unit 114 (③, ④ (in FIG. 18).

As described above, in the print system 101 in the present embodiment, in the case where a viewer sends a print instruction using a remote control 6 while playing back a program accumulated in the broadcasting data accumulation unit 110 of the digital broadcasting receiving apparatus, an image of the program displayed on the TV 4 or the print only data in association with the program is printed on a print paper 53 and additional program information such as a storage date and a program title are printed in header, footer and the like. Accordingly, the viewer can obtain a hard copy appropriate for filing, storing, and for a present for others without writing a memo by hand on the obtained print paper.

Note that, the present embodiment may have the case of including only a moving picture in the broadcasting content.

Third Embodiment

Figure 19:
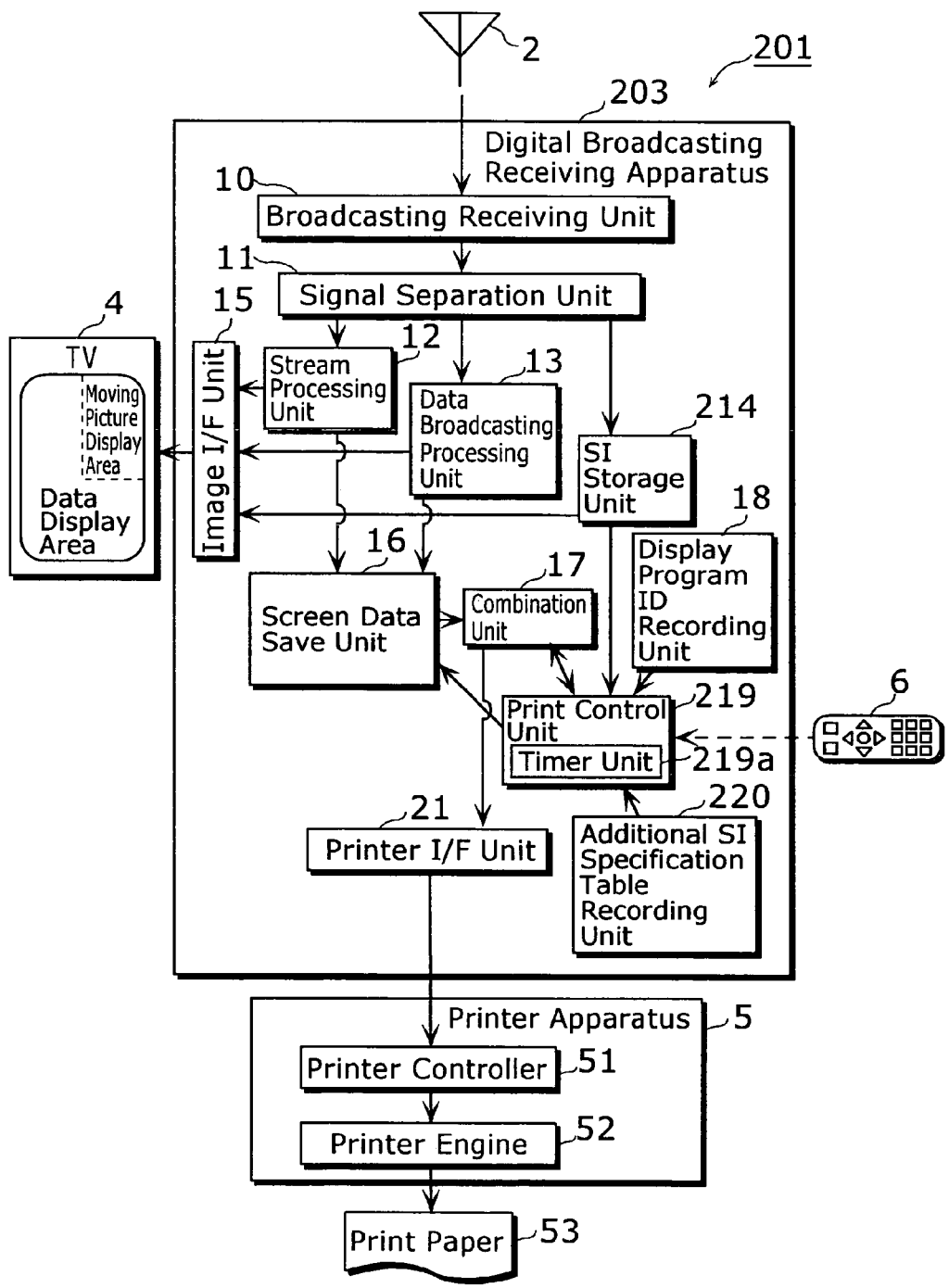
FIG. 19 is a functional block diagram showing a configuration of a print system according to a third embodiment of the present invention.

FIG. 19 is a functional block diagram indicating a configuration of a print system 201 according to third embodiment of the present invention. The print system 201 has in common with the first embodiment in that it is a system capable of printing an image displayed on a TV screen and the like together with additional information such as program title and the like. On the other hand, the print system 201 differs with the first embodiment in that description information for each scene or frame of a program are included in the additional information to be printed, the print system 201 comprising an antenna 2, a digital broadcasting receiving apparatus 203, a TV 4, a printer apparatus 5 and a remote control 6.

The digital broadcasting receiving apparatus 203 is a digital broadcasting receiving apparatus such as STB which receives broadcasting data including scene description information written in DDL (Description Definition Language) defined in MPEG7, comprising a broadcasting receiving unit 10, a signal separation unit 11, a stream processing unit 12, a data broadcasting processing unit 13, a SI storage unit 214, an image I/F unit 15, a screen data save unit 16, a combination unit 17, a display program ID recording unit 18, a print control unit 219, an additional SI specification table recording unit 220, and a printer I/F unit 21. The constituents that are not included in the digital broadcasting receiving apparatus 3 in the first embodiment are the SI storage unit 214, the print control unit 219 and the additional SI specification table recording unit 220.

Figure 20:
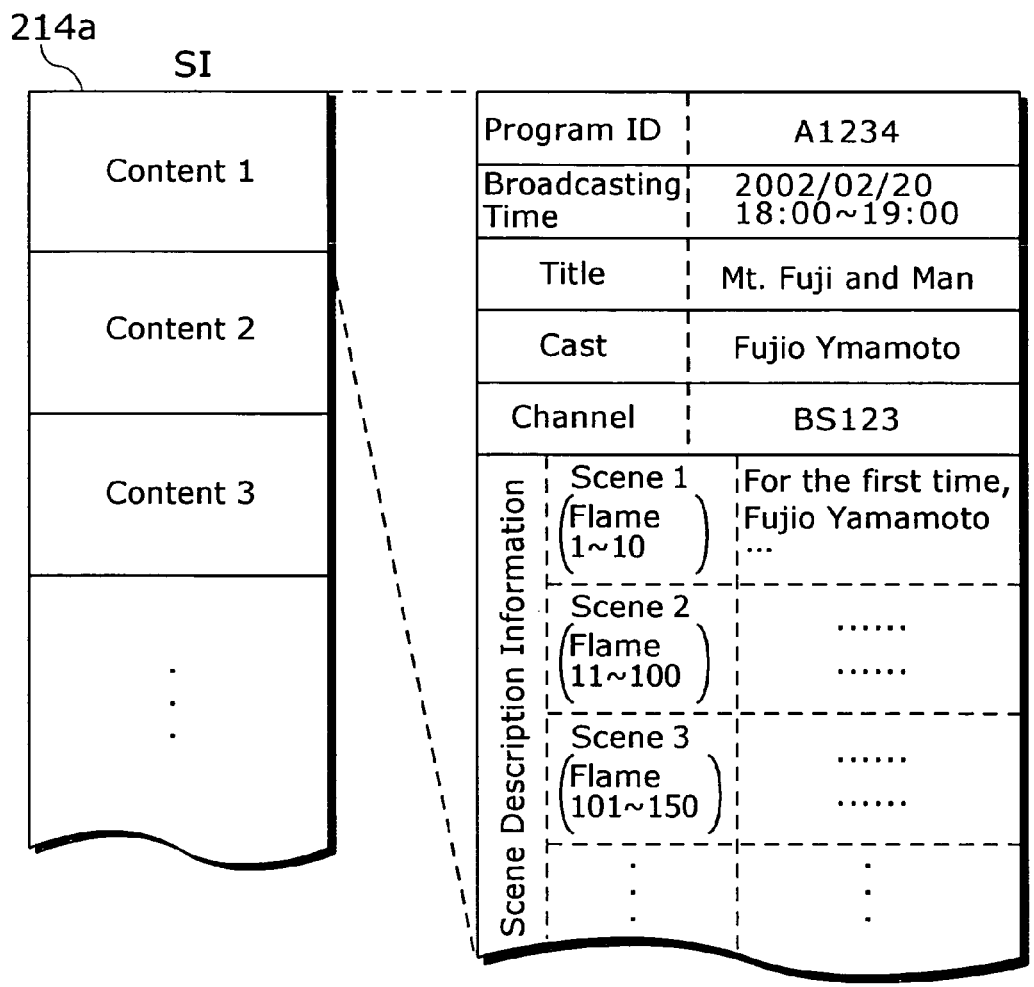
FIG. 20 is a diagram showing an example of SI stored in a SI storage unit in the digital broadcasting receiving apparatus.

The SI storage unit 214 stores SI 214*a* as shown in FIG. 20. The SI 214*a* holds information that "scene description information" is added to an item of the SI 14*a* in the first embodiment. The "scene description information" is additional information for each scene (one or more frame groups) which constitutes a program, for example, texts and the like which relate to casts or an overview of the scene, the additional information being sent from a broadcast together with SI.

The additional SI specification table recording unit 220 stores an additional SI specification table 220*a* as shown in FIG. 21. In this example, it is specified to print a "channel" of the program to be printed in the first line on the left side of the right half of the print paper 53, a "title" in the same first line of the center position; and a "scene description information" of the image scene to be printed in the same third line or after.

In addition to a function of the print control unit 19 in the first embodiment, the print control unit 219 has a function of having a timer unit 219*a* for specifying the time when a print instruction was sent by a viewer, reading out "scene description information" from the SI2 14*a* in the SI storage unit 214, outputting the readout information together with the additional SI to the combination unit 17 and bringing them into the print data, the scene description information being specified by the time and the display program ID readout from the display program ID recording unit 18.

Figure 22:
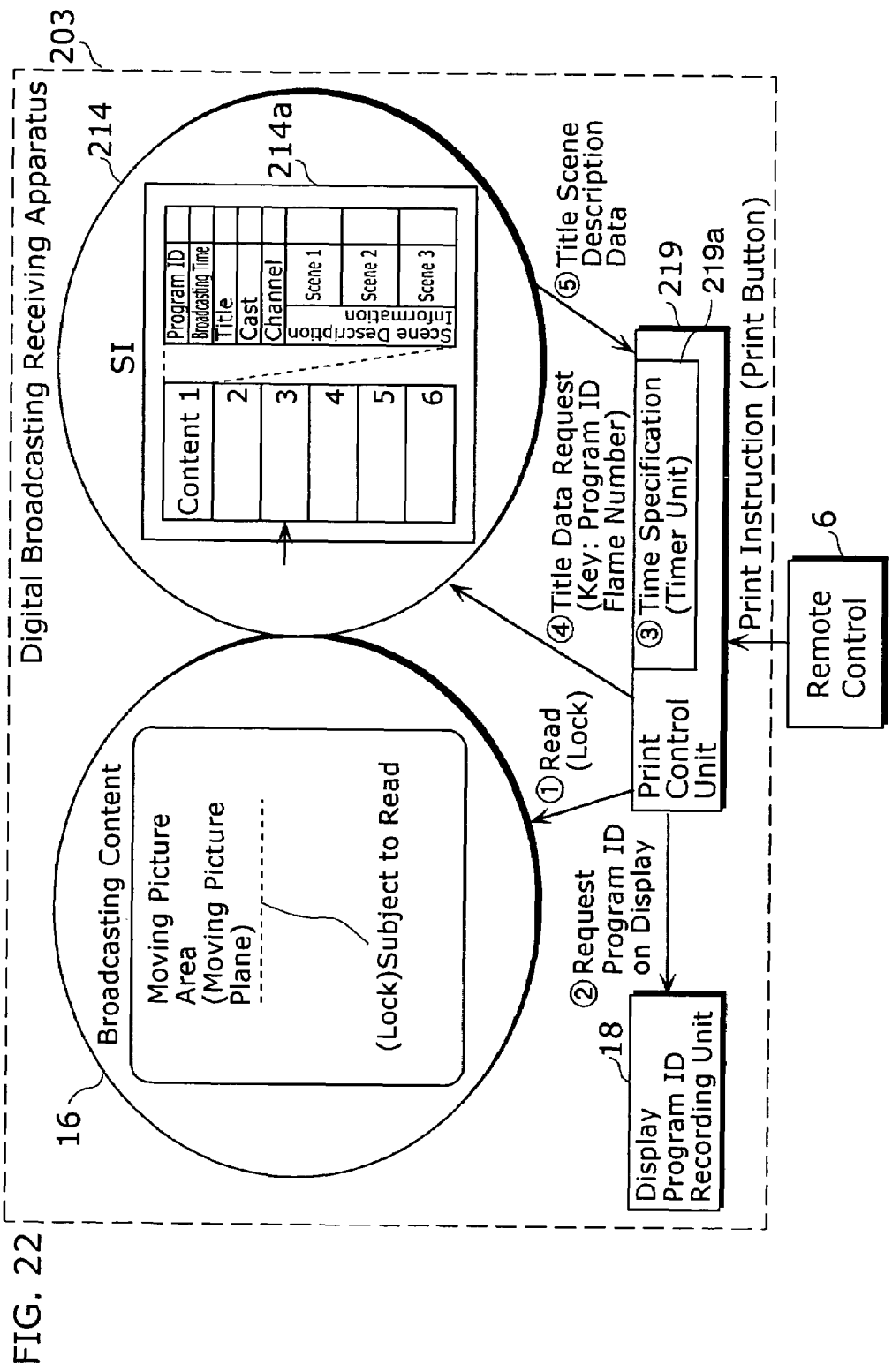
FIG. 22 is a diagram showing a generation process of print data in the case where the broadcasting content only includes moving pictures.

FIG. 22 is a diagram showing a generation process of print data in the case where the broadcasting content includes only moving picture, corresponding to FIG. 7 in the first embodiment. The print control unit 219 i) receives a print instruction sent by pushing a print only button on a remote control 6, ii) reports the reception to the screen data save unit 16, iii) holds (lock) an image displayed on a TV 4 at a moment, that is, a moving picture plane (① in FIG. 22), iv) reads out a display program ID recorded in the display program ID recording unit 18, v) specifies a program being displayed on the TV 4 at the time (② in FIG. 22), vi) refers to an internal timer unit 219*a*, and vii) specifies the time when a print instruction was sent (③ in FIG. 22). Then, the print control unit 219 specifies items of the additional SI (for example, "scene description information" etc.) with reference to the additional SI specification table 20*a* stored in the additional SI specification table recording unit 20.

Figure 23:
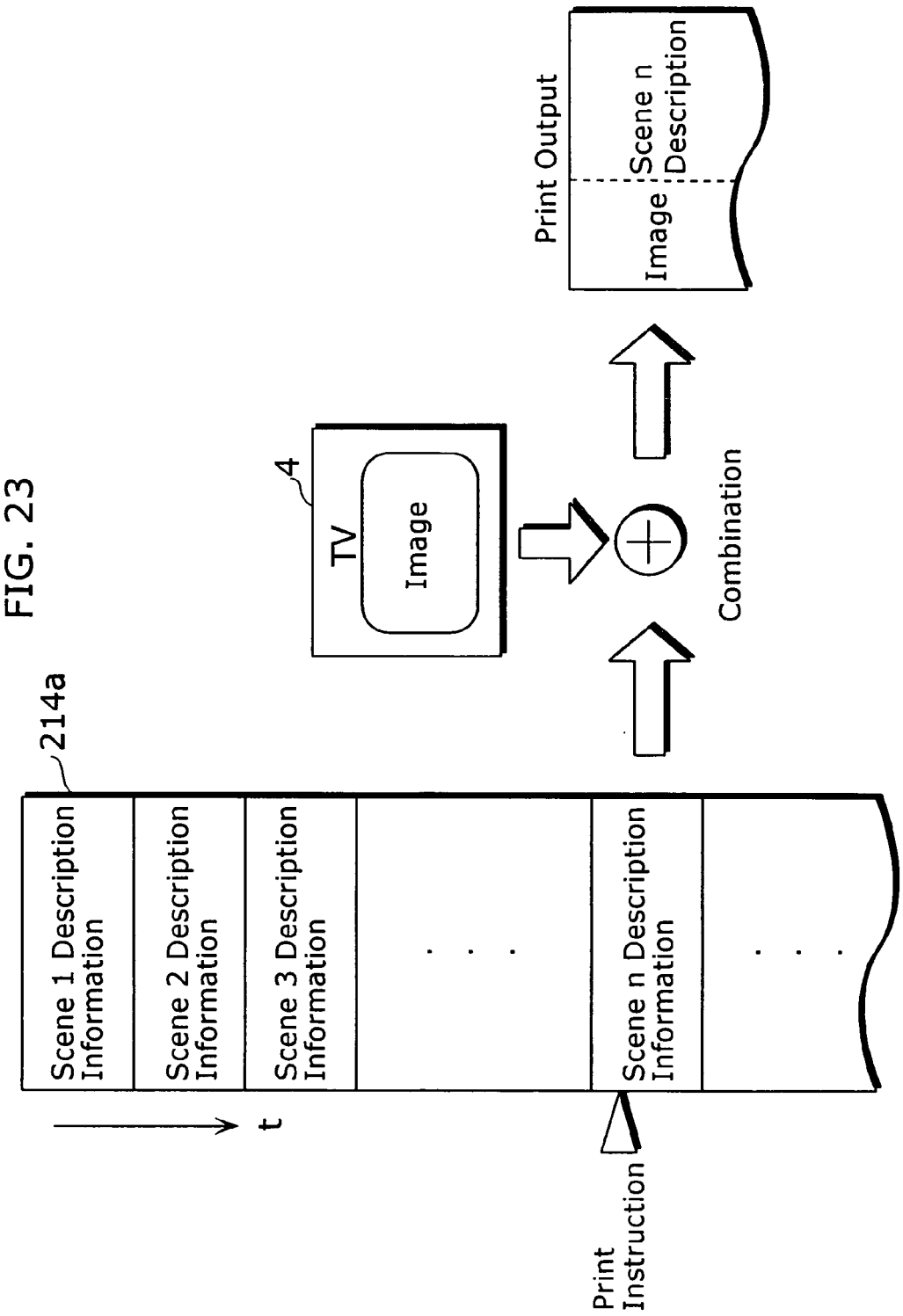
FIG. 23 is a diagram showing a flow of a process of composing scene description information and an image.

At this time, as shown in FIG. 23, in the case where the additional SI is "scene description information", the "scene description information" (for example, "Fujio Yamamoto is . . .") is readout from the SI storage unit 14 (④, ⑤ in FIG. 23), the scene description information being specified by the display program ID and the time. After that, the readout additional SI ("scene description information" etc.) and the image held in the screen data save unit 16 are combined at the combination unit 17, transferred to the printer apparatus 5 and printed out.

Figure 24:
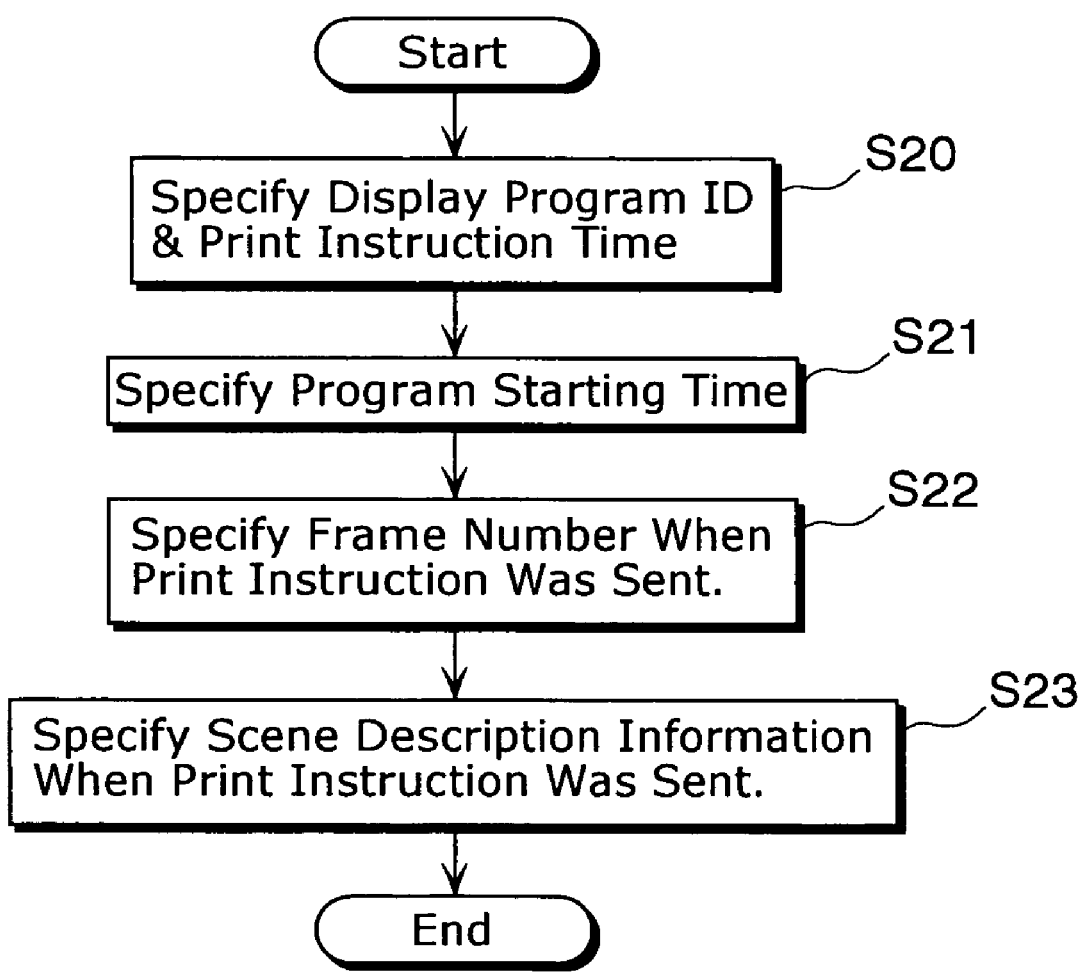
FIG. 24 is a flowchart of showing a process of specifying "scene description information" to be printed.

FIG. 24 is a flowchart of indicating steps of specifying "scene description information" to be printed. The print control unit 219 receives a print instruction by a viewer, and specifies a display program ID and the print instruction time displayed on the TV 4 at that moment with reference to the display program ID recording unit 18 and the timer unit 219*a* (Step S20).

Then, based on the display program ID, the print control unit 219 i) refers to SI 214*a* (broadcasting time etc.) in the SI storage unit 214, ii) specifies the starting time of the program (Step S21), calculates the elapsed time from the starting time till the print instruction time, iii) considers the frame rate (30 frames/minute etc.), and iv) specifies a frame number displayed on the TV4 when the print instruction was sent (Step S22).

Further, the print control unit 219 i) refers to scene information (range of frame numbers) of "scene description information" included in the SI 214*a*, ii) specifies a scene belongs to the frame number, iii) reads out the "scene description information" of the scene (Step S23), and iv) sends the read-out "scene description information" to be printed (additional SI) to the combination unit 17.

Figure 25:
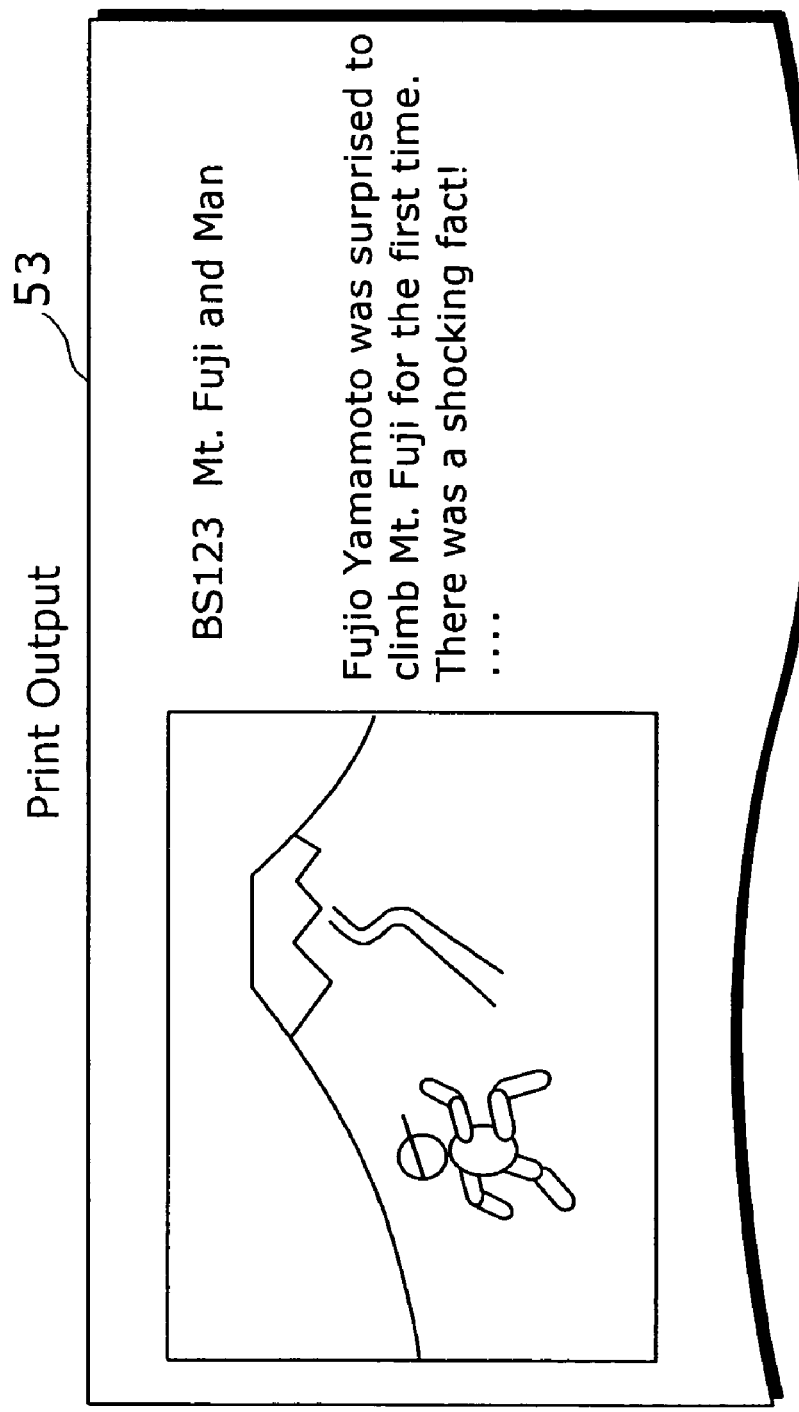
FIG. 25 is a diagram showing a relationship of a display on the TV and a print output at a printer apparatus in the case where the broadcasting content only includes moving pictures.

FIG. 25 is a diagram showing a relationship of a display on the TV 4 with a print output at the printer apparatus 5 in the case where the broadcasting content includes only moving pictures, corresponding to FIG. 8 in the first embodiment. In this example, it is specified to print the additional SI on the right half the print paper 53 (FIG. 21) in the additional SI specification table 220*a*. Therefore, the image of the program displayed at the time when the print instruction was sent (a hardcopy of a moving picture) is printed on the left half of the print paper 53 and the title of the program and the scene description information of the image scene are printed on the right half of the print paper 53.

As described above, under the print system 201 of the present embodiment, a viewer can obtain not only a hard copy of an image displayed on the TV 4 but also a print output added to the detailed information for each scene. Accordingly, the viewer can obtain a print output to which an explanation of different scene description is added as a scene differs even it is an image from the same program, and keep the print output papers in a format to which the additional explanation is added to an image scene in which the viewer is interested.

Note that, in the present embodiment, it is presumed that there is description information corresponding to all scenes. However, it is not necessarily to have description information corresponding to all scenes. While preparing only description information corresponding characteristic scenes, the description information most close to a scene is taken out as the scene is specified.

Next, a specific combination process for data to be printed (print body and additional information) and various print forms relating to a format of the print data and the like are explained.

Figure 26A:
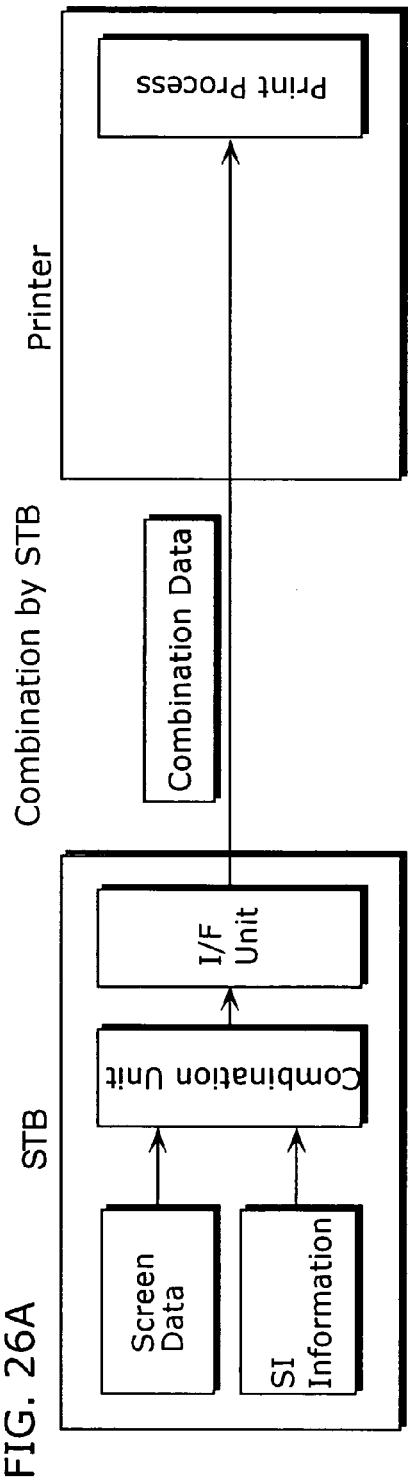
FIG. 26A is a diagram showing a flow of data in the case where main information such as screen data to be printed and additional information such as SI data are combined within the digital broadcasting receiving apparatus.
Figure 26B:
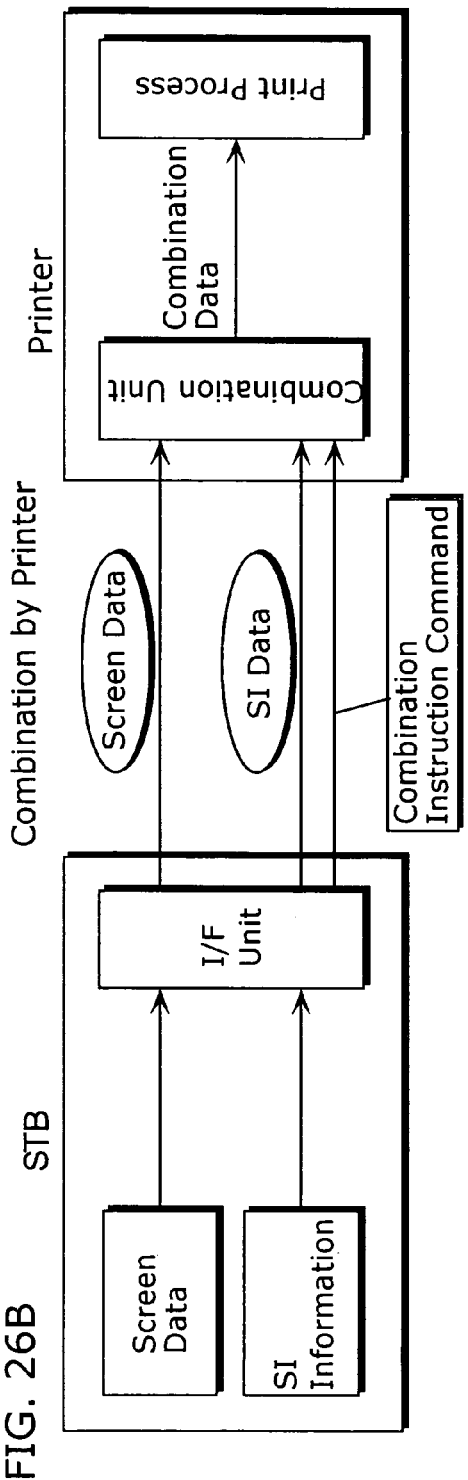
FIG. 26B is a diagram showing a flow of data in the case where the screen data and the SI data are transferred to the printer apparatus as they are and combined within the printer apparatus.

FIGS. 26*a* and 26*b* are diagrams showing two print methods focusing on a difference of subjects (digital broadcasting receiving apparatus/printer apparatus) which perform a combination of the print body with the additional information. That is, in the above mentioned present embodiment, as shown in FIG. 26A, main information such as screen data to be printed and the additional information such as SI data are combined in the digital broadcasting receiving apparatus and outputted to the printer apparatus. However, as shown in FIG. 26B, a method of transferring screen data, SI data and instruction command to the printer apparatus 5 and composing those screen data, SI data, and combination instruction command can be used.

Further, considering a subject which performs a combination process and a development process (a digital broadcasting receiving apparatus or a printer apparatus) and types of print data (constituents, data format etc.), following four patterns 1~4 of print methods are possible.

(1) Pattern 1

In this pattern, the print data include three sub data: (i) print body data (image data, image format), (ii) additional information (SI data, text format), and (iii) print script (header, footer printing instructions).

Following processes are performed in the receiving apparatus.

A "moving picture unit (moving picture data)" and a "data broadcasting unit (data of data broadcasting)" are displayed on a TV screen, and each unit exists as an image in other frame buffer. By composing the frame buffers, the receiving apparatus generates a "moving picture unit" "data broadcasting unit" mixed image as a print body data. Both frame buffers are locked until the combination is completed and the print body data are stored in an image buffer. After composing the print body data, the additional information is specified and taken out. Then, a print script is generated including header and footer printing instructions. After generating the three sub data, the three sub data are collected and sent to a printer as print data.

Note that in the case where the print body is only "moving pictures", the content in the frame buffer for moving pictures becomes a print body data. Therefore, a combination is unnecessary. Similarly, in the case where the print body is only "data broadcasting", the content in the frame buffer for data broadcasting display becomes a print body data. Therefore, a combination is also unnecessary.

On the other hand, following processes are performed in a printer apparatus.

Firstly, the printer apparatus receives the print data and takes out the three sub data. Then, it specifies which additional information to be printed in where (header or footer) from the taken out print script. The additional information for the specified text format is developed in font and generated as additional information image. Lastly, the additional information image and the print body data (image) are combined and the data are sent to the print engine and printed. In here, a resolution conversion adapting to a resolution of the printer is required at the time of combination.

According to a print method by the pattern 1, there is an advantage that the process in the receiving apparatus becomes easier. That is, if there is a function of generating a screen hard copy, it can be used for generating a data for the print body. In addition, there is an advantage that a display layout and a print layout are the same. It is because the displayed image is used for printing as it is.

On the other hand, weaknesses are follows: (i) the low resolution image for a TV display is printed so that the image quality of print picture becomes poor even it is outputted to a high resolution printer; (ii) the image cannot correspond to "print only content"; and (iii) the image cannot be printed within one screen page in a data broadcasting with a HTML base, causing inconveniences such as requiring an operation of a screen scroll at the time of printing.

(2) Pattern 2

In this pattern, print data is formed of a combination image of print body data (image data, image format) with an additional information image.

Following processes are performed in the receiving apparatus.

The processes until the print body data combination are same as those of the pattern 1. Then, the taken out additional information (text base) is developed to an image by a font which has an internal receiving apparatus, and combined with the print body data. Lastly, the combination image is sent to a printer as print data.

On the other hand, following processes are performed in the printer apparatus.

Since the received print data is an image data, the data is sent to the print engine and printed. In here, the data can be sent to the print engine after converting a resolution adapting to a resolution of the printer.

According to the print method by the pattern 1, there is an advantage that processes in the receiving apparatus become easier without an image combination. In addition, similar to the pattern 1, there is an advantage that a display layout and a print layout are the same.

On the other hand, the possible weaknesses are similar to the pattern 1 (inferiority of image quality of the print picture, unadaptability to the "print only content", and inconvenience for printing the screen of data broadcasting with a HRML base) and the like, requiring a font development of the taken-out additional information (text base).

(3) Pattern 3

In this pattern, the print data includes (i) a top page file written in markup language (combination data of print body with additional information) and (ii) one or a plurality of image files (still image of a moving picture, button etc.).

Following processes are performed in the receiving apparatus.

Here assumes that moving pictures and data broadcasting content coexist (an example shown in FIG. 6). The "moving picture" unit, as well as in the patterns 1 and 2, is displayed on a TV screen and exists in a moving picture frame buffer as an image. Then, the data broadcasting content is provided as document data written in markup language such as BML and HTML.

The receiving apparatus receives the print data and converts it into an internal data structure called DOM tree and stores the converted data. The receiving apparatus performs a display of data broadcasting based on the DOM tree. In here, actions at which external events such as pushing down a remote control button to occur are written in a document data as scripts. An action of switching a display of a button and the like are mainly written in the script. The receiving apparatus changes the DOM tree based on the action written as a script when an external event occurs. Since the DOM tree and the display of data broadcasting correspond one on one, a result of changing DOM tree reflects on a display. In here, a process relating to DOM tree, that is, a DOM tree generation, an event correspondence process and a storing process are performed in a data broadcasting processing unit 13.

As a print instruction is sent from a remote control, the screen data save unit 16 locks the moving picture frame buffer and the DOM tree and those contents are stored in a buffer. At the same time, the print control unit 19 specifies a SI storage unit 14 and related additional information, takes out the specified SI storage unit and the additional information from the SI storage unit 14 and stores them, the SI storage unit 14 associating with a display program ID of a display program ID recording unit 18. Since the DOM tree is an internal data, the screen data save unit 16 converts the DOM tree into an XML document that a printer apparatus can decode. There is an XTML-Print as a format of the XML document.

The screen data save unit 16 performs a format conversion converting image data of the moving picture frame buffer into a JPEG format which is an image format supported by an XHTML-Print format. While the body of the image data of the converted moving picture frame exists separately as JPEG data (a file whose extension ends with JPEG), the body is referred in association with the print body data as an object element. FIG. 27 is a diagram showing an example of print body data. The next row of <! - - image - - > applies to an image data of the moving picture frame.

The combination of additional information with print body data is described as follows. In here, a "channel number" and a "program title" are added to header and a "cast" is added to footer. In this case, an example of data combined of the additional information with the print body data is as shown in FIG. 28.

In FIG. 28, the next block of <! - - header - - > indicates a header unit and the next block of <! - - footer - - > indicates a footer unit. The print data and the image file body shown in this diagram are sent to a printer apparatus.

On the other hand, following processes are performed in the printer apparatus.

The received print data is analyzed in an interpreter of an XHTML-Print. The JPEG data is extended and the text data is photo developed, image developed, sent to an image engine, and printed. In here, the JPEG data can be sent to a print engine after performing a resolution conversion adapting to a resolution of a printer. FIG. 29 is a diagram indicating a relationship of a print output and a print data printed through these processes.

According to the print method by the pattern 3, it is an advantage that a "data broadcasting unit" is printed in a print resolution of a printer so that a high quality print output is obtained. Furthermore, it is easy to print a data broadcasting screen on an HTML base. In a data broadcasting on an HTML base which is going to be emerged, there is a possibility of requiring a screen scroll since the display content cannot be contained in one screen page. However, according to this pattern, a DOM tree is generated at the time when an HTML is read. Therefore, a print data for a non-displayed page can be generated from the DOM tree. Then, it becomes possible to print non-displayed areas so that an operation of repeatedly scrolling a screen and printing becomes unnecessary.

On the other hand, weaknesses are that (i) there is a difference between a display layout and a print layout and (ii) the data broadcasting unit cannot deal with the "print only content". It is because that the "print only content" cannot be read and the DOM tree, therefore, does not exist.

Note that, the flow of the process is the same in the cases of where the broadcasting content includes only moving pictures and where it includes only data broadcasting content. In other words, only the print body data differs. FIG. 30 shows an example of print body data in the case where the broadcasting content includes only moving pictures and FIG. 31 shows an example of print body data in the case where the broadcasting content includes only data broadcasting content.

(4) Pattern 4

In this pattern, print data includes (i) a top page file written in markup language (a combination data of print body with the additional information) and (ii) one or a plurality of image files (button, still picture image etc.).

Following processes are performed in the receiving apparatus.

In the pattern 3, the print body data is generated from the DOM tree and the moving picture image. However, in the case of print only content, the print body data is the print only content itself. Therefore, a generation is unnecessary. In addition, the print only content is sent in a print only format. The XHTML-Print is a print format as well as in the Pattern 3.

A combination of a specification, a takeout and a storage of related additional information after a print instruction is sent and the additional information with print body data are the same as in the pattern 3. Also, processes at a printer apparatus are same as in the pattern 3.

According to a print method in the pattern 3, it is an advantage that a print output in association with the "print only content" is possible.

As above described, in the print system according to the present invention, various print methods as shown in the patterns 1 to 4 are possible, considering a specific combination process of data to be printed (print body and additional information), a format of print data to be printed and the like. The specific method can be determined taking an account of needs of a user, uses and the like, considering respective advantages and the weaknesses.

Thus, the print system according to the present invention is explained based on embodiments 1 to 3. However, the present invention does not limit its function to those embodiments.

For example, in the embodiments, additional information to be printed with an image and the print positions are determined by an additional SI specification table 20a and the like that can be set by a viewer. However, not only limiting to the table method, they can be locked as in "a channel and a title are printed on the left side of header".

Furthermore, when a moving picture displayed on a TV screen is hard copied, the copyright information indicating an owner of a copyright for the moving picture can be printed not as header, footer or the like, but by forcibly composing the copyright information in watermark letters like a superimpose on the moving picture itself. Especially, when a high picture quality moving picture such as High-Vision is hard copied, it tends to have problems on copyrights. Therefore, the high picture quality moving picture and the copyright information may be combined. On the other hand, the combination may not be performed when a standard picture quality moving picture is hard copied. Thus, the case that the copyright information is forcibly combined in watermark letters on the screen of the moving picture displayed at the time when a print instruction was sent, only in the case where the moving picture to be hard copied has high picture quality, is explained with the print system 1 shown in FIG. 1 as an example. The print system 1 does not need to add new constituents to execute the combination by only adding, to a function of the print control unit 19, a function of judging whether or not a moving picture to be hard copied is high picture quality and composing the copyright information in watermark letters to a combination unit 17 when the moving picture has high picture quality, and adding, to a function of the combination unit 17, a function of composing the watermark letters on the moving picture according to an instruction by a print control unit. It is same in the print system 101 shown in FIG. 14 and the print system 201 shown in the FIG. 19. In FIG. 1, the print control unit and the combination unit having those functions are indicated as a print control unit 19a and a combination unit 17a. Furthermore, the additional SI specification table recording unit 20 records a fixed pair of additional SI (channel, program title) and the print position corresponding to the copyright information inside the additional SI specification table as explained.

Figure 32:
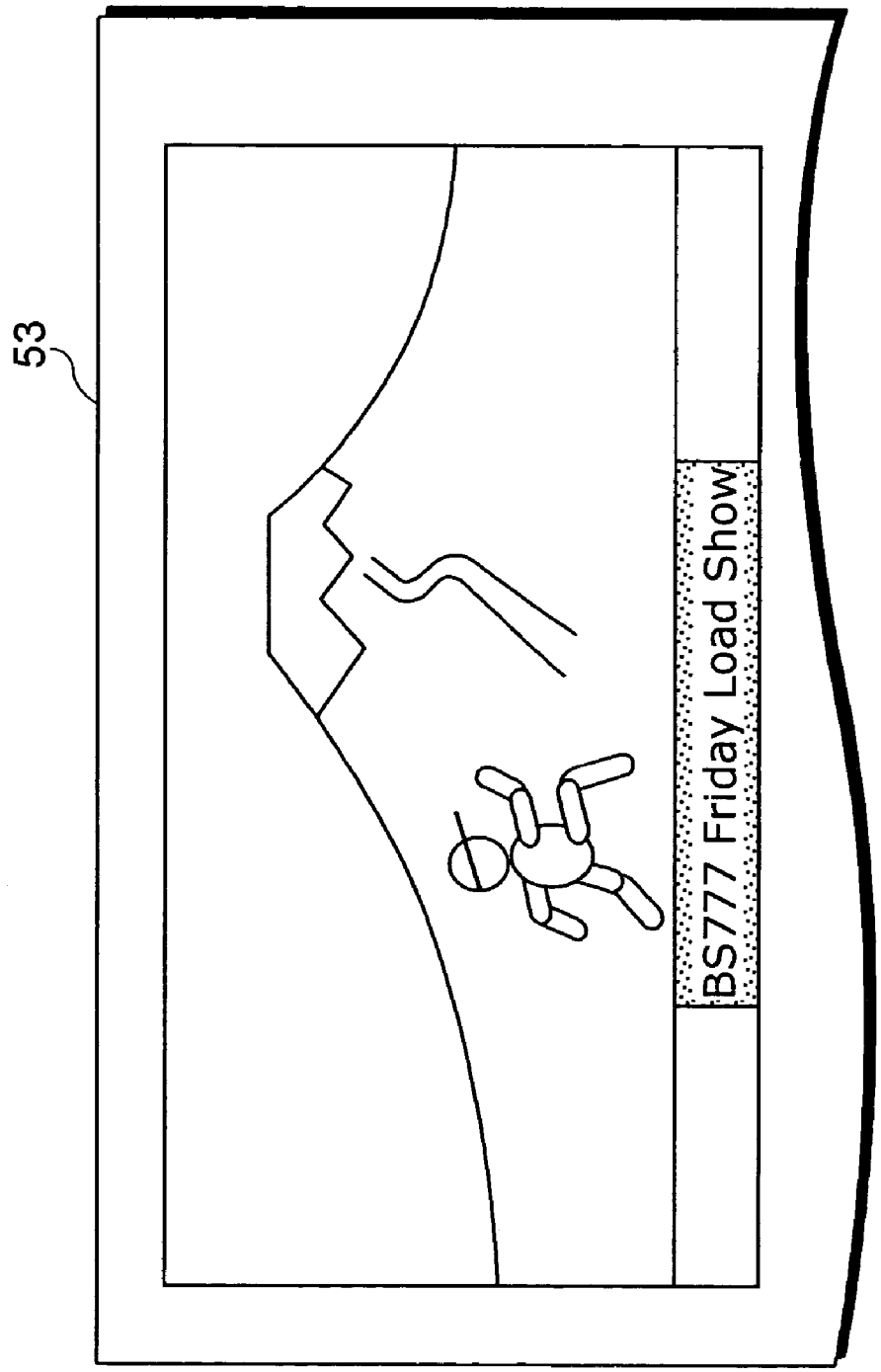
FIG. 32 is a diagram showing a print output at a printer apparatus in the case where copyright information is printed on a hard copy of a moving picture.

FIG. 32 is a diagram indicating a print output at the printer apparatus 5 in the case where copyright information is printed on a hardcopy of a moving picture. Following explains about the case where the broadcasting content includes only moving pictures. As shown in FIG. 8, here assumes that a print instruction is sent by pushing a print only button and the like on a remote control 6 while a moving picture of a program (for example, "Friday Road Show") is displayed on a screen of the TV 4. The print control unit 19a then judges whether or not the image is Hi-Vision by the SI 14a shown in FIG. 2 and executes a control process as shown in FIG. 7. As above explained, in the case where the image displayed at the time when the print instruction was sent is not Hi-Vision, the printer apparatus 5 prints the image of the program (a hard copy of a moving picture) at the time when the print instruction was sent in the middle of a print paper 53. In the case where the image at the time when the print instruction was sent is Hi-Vision, a moving picture hard copy is printed in the middle of the print paper 53, the moving picture hard copy being that a channel (for example, "BS777") and a program title (for example, "Friday Road Show") that are copyright information are combined in watermark letters in a predetermined position (for example, a middle of the under part of a moving picture) on the hard copy of the moving picture.

While the "white letter" is generally used for watermark letter in a BS broadcasting, in the case where a picture on which copyright information is combined is a whitish picture, it is difficult to read the write watermark letters overwritten on the image locked at the time when a print instruction was sent. Changing the color of watermark letter leads the same result. For example, in the case where the watermark letter is changed to "black letter", it is difficult to read when the background is a blackish picture.

Therefore, the combination unit 17a once writes copyright information on a text box in "white letters" and generates a print picture by a composing the generated text box with the locked image after selecting a background color of the text box which raises the white letters. The a combination is a technique generally used for composing watermark letters and the like, and a method for calculating a brightness value at a position where a picture and watermark letters overlap by adding in a proportion of α to (1−α). Thus, by selecting a background color which has a larger contrast with a color of the watermark letter, copyright information can be clearly printed on the image regardless of a type of the locked image.

Figure 33:
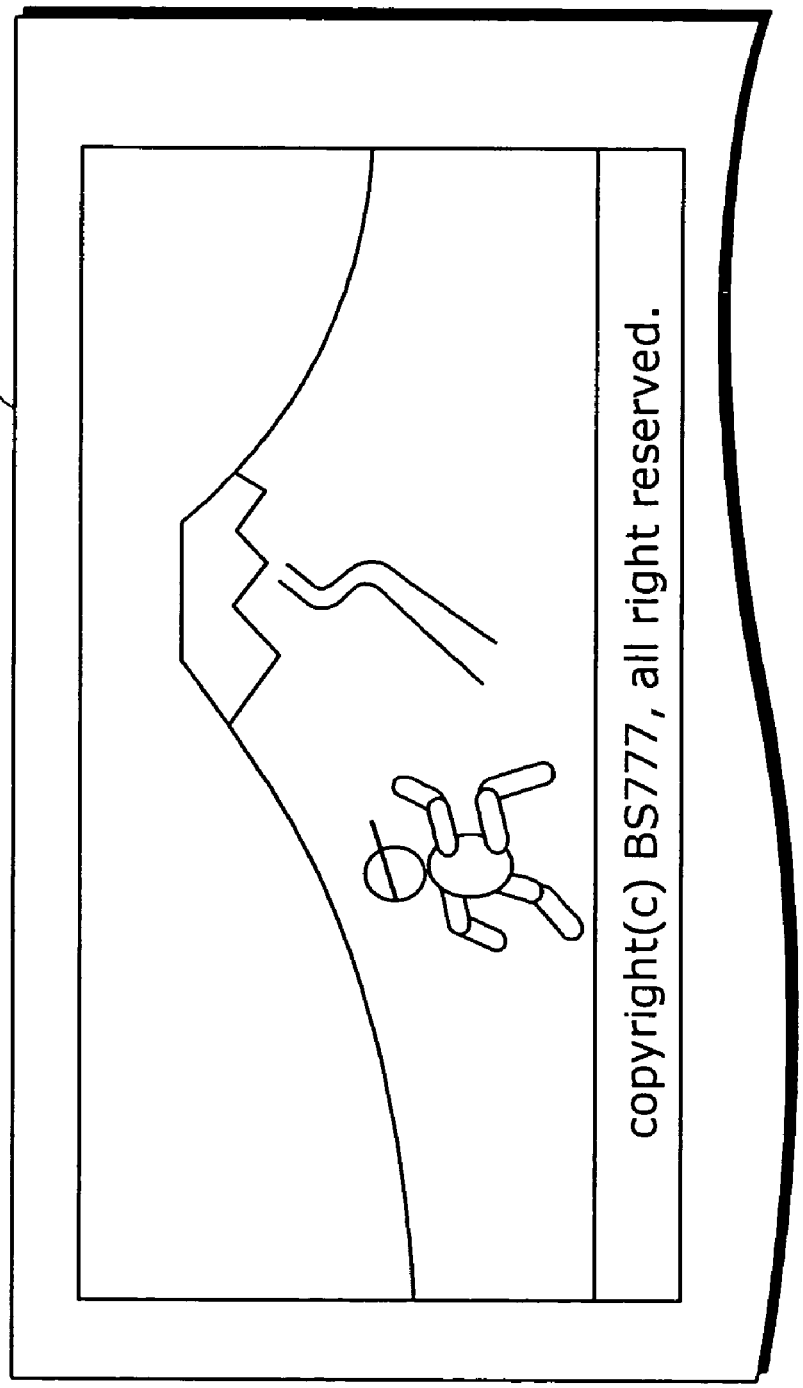
FIG. 33 is a diagram showing one example of other description methods for the copyright information.

FIG. 33 is a diagram showing an example of other description methods for copyright information. In FIG. 32, an example of describing a channel and a program title as copyright information is explained. As shown in FIG. 33, for example, the copyright information can also be described as "copyright (c) BS777, all right reserved". This method is more effective to clearly indicate the copyright since it is commonly known as a method of indicating copyrights. Also, the copyright information can be described as "(c) BS777". Here, the "(c)" is an abbreviation of "copyright" and "BS777" indicates a broadcasting channel. When the copyright information is described like this, the channel "BS777" is obtained from SI14a and character strings other than the channel "BS777" (for example, "copyright (c)" and "A, all right reserved") and character strings such as "(c)" are previously stored in a nonvolatile memory such as ROM which is not shown in a figure, as a part of a program for composing copyright information or as a character string to be combined with SI such as channel every time when the copyright information is combined. Alternatively, they are previously recorded in an additional SI specification table recording unit 20 or in a memory such as SI storage unit 14. In this case, it is needless to say that a program title can be described as well as a channel. Furthermore, as shown in FIG. 32, the watermark letter can be combined on a moving picture using the text box.

In here, it is explained as an example that the digital broadcasting receiving apparatus 3 previously combines the watermark letter indicating copyright information with a moving picture to be hard copied, generates the print body data, and outputs the generated print body data to the printer apparatus 5. Nevertheless, as explained in FIG. 26B, the printer apparatus 5 can combine a moving picture and copyright information according to a combination instruction command from the digital broadcasting receiving apparatus 3 without composing the moving picture with the copyright information in the digital broadcasting receiving apparatus 3. In this case, a screen data, a SI data and a combination instruction command are outputted from the digital broadcasting receiving apparatus 3 to the printer apparatus 5. In response to this, the combination instruction command include following information: i) information indicating whether or not to combine copyright information, ii) information for specifying copyright information in SI data when the copyright information is combined, ii) information indicating whether or not to combine additional information, and iv) information for specifying additional information in the SI data. Thus, the printer apparatus 5 combines a screen data with a SI data on which the SI data that is additional information is overwritten on a screen data that is a print picture in the case where the combination instruction command is instructed to protect a copyright of a print picture. That is, the copyright information written in watermark letters is combined with a moving picture using a print font held in the printer 5. Therefore, it is printed in a water mark language with clear picture quality than a combination using the font held in the digital broadcasting receiving apparatus 3.

Note that, it is needless to say that this case is applicable not only to the digital broadcasting but also to the analog broadcasting. That is, in the analog broadcasting by which a program and the additional information such as SI are sent, the same result as a print example in FIG. 32 can be obtained by the analog broadcasting receiving apparatus having a similar print control function as that of the digital broadcasting receiving apparatus 3.

Although this case processes a print body as screen image data, similar to the above mentioned "(1) In the case where broadcasting content includes moving pictures and data broadcasting contents", the print body can be processed as a document written in markup language such as BML. Since this case does not have data broadcasting content, the process of composing print body from the data broadcasting content with the moving picture is not performed. Other than that, the processes are same as those of the above mentioned "(1) In the case where broadcasting content includes moving pictures and data broadcasting contents".

Although, in the embodiments, a display program is specified by a display program ID stored in the display program ID recording unit 18, a method for specifying a display program is not limited to this method. For example, a display program can be specified from the information (channel information) for specifying a channel selected at the time and the time when a print instruction is sent. Similarly, in a specification of a scene or a frame picture in the third embodiment, the scene or the frame picture displayed at that moment can be specified from the channel selected at the time when the print instruction was sent and the time with reference to the contents of SI (channel for each program, broadcasting time, etc.).

Furthermore, in the first embodiment and the like, the screen data save unit 16 reads out the image to be printed from the stream processing unit 12 and the data broadcasting processing unit 13 and holds the readout image after receiving a report that a print instruction was sent. Here, in spite of the print instruction, the screen data save unit 16 can hold data to be printed by regularly repeating to obtain a moving picture and data broadcasting content to be displayed from the stream processing unit 12 and the data broadcasting processing unit 13 and to update by stopping the obtainment when the print instruction is received.

In the embodiments, the subjects to be printed are an image displayed on the TV 4 at a moment when a print instruction was sent print only data received at the time and the like. However, the subjects to be printed according to the present invention are not limited to the contents at the timing. The content received and displayed at the time when certain time delayed from the moment when a print instruction is sent or at the time when certain time backdated can be printed. For example, a print output at a just timing is realized by storing the received image into a ring buffer and the like and shifting the timings of displaying and print outputting for certain time, the just timing being corrected an operational delay for a print instruction by a user.

In the embodiments, a screen as a whole displayed on the TV 4 is printed. In the case where the broadcasting data is written in a markup language and the like and a displayed image is distinguished by each object to be displayed on the screen, for example, a print output can be performed after deleting unnecessary display object such as a button used for a communication with a viewer from printing.

In the embodiments, an apparatus for receiving an image and outputting print data is a broadcasting receiving apparatus such as STB. Replacing to this, a communication apparatus such as a cellular phone and a personal computer are used. That is, the print system according to the present invention does not limit its function to a broadcasting system, but also applies to an image distribution system and the like by an Internet and a CATV via a public network and a communication cable. Then, by incorporating a print control function held by a digital broadcasting receiving apparatus according to the embodiments into a cellular phone, a personal computer and the like, it becomes possible to print output the received image and the print only data together with the additional information.

For example, think about a content distribution system on the Internet. That is, a distribution server is a web server for performing a stream distribution of contents such as movie, the distribution server providing catalog information describing a list and an outline of content to be distributed. Then, the distribution server receives a distribution request with a content ID described in catalog information from a terminal apparatus and distribute a content associating with the content ID to the terminal apparatus. In such system, it becomes possible to print additional information such as title together with a distributed content as header and footer, as described in the embodiments, using a terminal apparatus such as cellular phone.

Specifically, firstly, an operator accesses to the web server using a cellular phone and downloads catalog information, as SI in the embodiments, and the downloaded catalog information is recorded in the cellular phone. Next, the operator sends the content ID selected from the catalog information to the web server and performs a predetermined print operation when a moving picture and the like are displayed receiving the content distribution. At this time, the additional information of the content being distributed at the time such as title and outline can be specified by searching the catalog information recorded in the cellular phone using the content ID selected by the operator as a key. Then, a print data is generated and transferred the print data to a printer apparatus connected to the cellular phone or a printer apparatus on the Internet, the print data being the image displayed at the time as print body and additional information such as title as header. Accordingly, it becomes possible to print output not only the image displayed on a screen of a cellular phone but also the additional information as header.

Furthermore, in the embodiments, a print picture and additional information are printed on a same print paper. Not limiting to this, the present invention can print a print picture and additional information on a separate print paper for using as one set. This is effective in the case where there are various additional information.

A print system according to the present invention is useful as a print system for receiving an image from not only limited to a broadcasting system but also from an image distribution system and the like by an Internet and a CATV via public network and a communication network and for printing the image. Also, a digital broadcasting receiving apparatus according to the present invention, a cellular phone, a personal computer and the like are useful for an apparatus for receiving an image from the broadcasting system, an image distribution system and the like by the Internet and the CATV via the public network and the communication table and for outputting the print data. Furthermore, a printer apparatus according to the present invention is useful as a printer for printing the image received from the broadcasting system, the image distribution system and the like by the Internet and the CATV via the public network and the communication cable together with additional information such as program information and copyright information.

The invention claimed is:

1. A receiving apparatus comprising:
a receiving unit operable to receive data distributed via a transmission line;
a print instruction obtainment unit operable to obtain a print instruction;
a print object specification unit operable to (i) specify, at a time when the print instruction is obtained, one screen of a moving picture identified in the print instruction, as a picture to be printed, the picture to be printed being specified from among the data received by the receiving unit, (ii) judge whether or not quality of the moving picture is high, and (iii) specify first additional information identifying an owner of a copyright of the moving picture and being associated with the specified picture to be printed together with the specified first additional information, the first additional information being specified in association with the specified picture to be printed only in a case where the quality of the moving picture is judged to be high; and
an output unit operable to output the specified picture to be printed and the specified first additional information associated therewith as print data to be printed on a single print paper.

2. The receiving apparatus according to claim 1,
wherein the data received by the receiving unit includes a program provided by broadcasting,
wherein the receiving unit further receives program information related to the program,
wherein the print object specification unit (i) specifies one screen of a moving picture included in the program and identified in the print instruction and (ii) specifies program information corresponding to the specified one screen of the moving picture included in the program as second additional information, and
wherein the output unit outputs the specified picture to be printed, the specified first additional information and the specified second additional information as print data to be printed on a single print paper.

3. The receiving apparatus according to claim 2,
wherein the program information identifies at least one of a broadcasting time, a title, a program title, a cast, a channel and a program outline for each program, and
wherein the print object specification unit specifies at least one of the broadcasting time, the title, the program title, the cast, the channel and the program outline as the second additional information.

4. The receiving apparatus according to claim 2, further comprising a display output unit operable to output, for display or as a signal, the data received by the receiving unit,
wherein the print object specification unit specifies one screen of the moving picture included in the program as the picture to be printed, the program to be outputted for display or as a signal by the display output unit at the time when the print instruction is obtained.

5. The receiving apparatus according to claim 4, further comprising a program identification information recording unit operable to record program identification information identifying the program to be outputted for display or as the signal by the display output unit,
wherein the print object specification unit specifies program information, as the second additional information, the program information corresponding to the program identified in the program identification information recorded in the program identification information recording unit.

6. The receiving apparatus according to claim 4, further comprising:
a channel information recording unit operable to record channel information that identifies a selected channel; and
a time unit operable to identify a present time,
wherein the program information identifies a channel and broadcasting time for each program, and
wherein the print object specification unit specifies, as the second additional information, the program information related to a program identified by a channel and a broadcasting time, the channel being identified in the channel information recorded in the channel information recording unit, and the broadcasting time being a time identified by the time unit at the time when the print instruction is obtained.

7. The receiving apparatus according to claim 4,
wherein the display output unit includes a buffer area in which one screen of the moving picture is temporarily held as image data, and
wherein the output unit outputs the image data held in the buffer area as the specified picture to be printed at the time when the print instruction is obtained.

8. The receiving apparatus according to claim 4,
wherein the data received by the receiving unit includes image data and screen display data written in a markup language, and
wherein the output unit outputs the image data and the screen display data as the specified picture to be printed.

9. The receiving apparatus according to claim 4,
wherein the receiving unit further receives print exclusive information generated exclusively for printing, and
wherein the print object specification unit specifies the print exclusive information as the picture to be printed.

10. The receiving apparatus according to claim 4,
wherein the program information includes description information that describes an explanation for each scene or frame picture constituting a program, and
wherein the print object specification unit specifies the description information as the second additional information.

11. The receiving apparatus according to claim 10, further comprising a scene specification unit operable to specify a scene or a frame picture to be outputted for display or as a signal by the display output unit,
wherein the print object specification unit specifies the description information as the second additional information, the description information corresponding to the scene or the frame picture specified by the scene specification unit.

12. The receiving apparatus according to claim 11, wherein the scene specification unit specifies the scene or the frame picture based on (ii) the program to be outputted for display or as a signal by the display output unit and (ii) the time when the print instruction is obtained.

13. The receiving apparatus according to claim 11, wherein the scene specification unit specifies the scene or the frame picture based on a channel and the time when the print instruction is obtained, the channel being a channel selected at the time when the print instruction is obtained.

14. The receiving apparatus according to claim 11,
wherein the description information is description information for each scene associated with one or more frame pictures, and
wherein the scene specification unit specifies a scene to which the frame picture belongs, the frame picture being outputted for display or as a signal by the display output unit.

15. The receiving apparatus according to claim 2, further comprising an accumulation unit operable to accumulate the program and the program information received by the receiving unit,
wherein the print object specification unit specifies the picture to be printed and the second additional information for the program and the program information accumulated by the accumulation unit.

16. The receiving apparatus according to claim 1, wherein the output unit generates print data for (i) printing the specified picture to be printed as a print body on the print paper and (ii) printing the specified first additional information as a header and a footer on the print paper and the output unit outputs the generated print data.

17. The receiving apparatus according to claim 1, wherein the output unit (i) generates print data for printing the specified picture to be printed and for printing the specified first additional information in a layout in which the specified picture to be printed and the specified first additional information are horizontally aligned on a single print paper, and (ii) outputs the generated print data.

18. The receiving apparatus according to claim 1, wherein the output unit (i) combines the specified picture to be printed with the specified first additional information associated therewith, as combined print data for printing on a single print paper, and (ii) outputs the combined print data.

19. The receiving apparatus according to claim 1,
wherein the output unit outputs the print data to a picture forming apparatus, and
wherein the picture forming apparatus combines the specified picture to be printed with the specified first additional information included in the print data into combined data for printing on a single print paper and prints out the combined data.

20. The receiving apparatus according to claim 1, wherein the output unit combines the specified picture to be printed with the specified first additional information as combined print data and outputs the combined print data so that the specified first additional information is written over the specified picture to be printed.

21. The receiving apparatus according to claim 1, wherein the output unit combines the specified picture to be printed with a copyright mark and the specified first additional information as combined print data so that the copyright mark and the specified first additional information are written over the specified picture to be printed, and outputs the combined print data.

22. The receiving apparatus according to claim 1, wherein the output unit outputs a print control command instructing protection of a copyright of the specified picture to be printed, in addition to outputting the print data.

23. A print system comprising a receiving apparatus and a picture forming apparatus,
wherein the receiving apparatus includes:
a receiving unit operable to receive data distributed via a transmission line;
a print instruction obtainment unit operable to obtain a print instruction;
a print object specification unit operable to (i) specify, at a time when the print instruction is obtained, one screen of a moving picture identified in the print instruction, as a picture to be printed, the picture to be printed being specified from among the data received by the receiving unit, (ii) judge whether or not quality of the moving picture is high, and (iii) specify additional information identifying an owner of a copyright of the moving picture and being associated with the specified picture to be printed together with the specified additional information, the additional information being specified in association with the specified picture to be printed only in a case where the quality of the moving picture is judged to be high; and
an output unit operable to output the specified picture to be printed and the specified additional information associated therewith to the picture forming apparatus, and
wherein the picture forming apparatus includes:
a receiving unit operable to receive the specified picture to be printed and the specified additional information outputted from the receiving apparatus; and
a print unit operable to print out the received specified picture to be printed and the specified additional information on a single print paper.

24. The print system according to claim 23, wherein the print unit combines the specified picture to be printed with the specified additional information into combined data to be printed on a single print paper and prints the combined data on the single print paper.

25. The print system according to claim 24, wherein the print unit prints out the specified picture to be printed as a print body on the print paper and prints out the specified additional information as a header and a footer on the print paper.

26. The print system according to claim 24, wherein the print unit prints out the specified picture to be printed and the specified additional information in a layout in which the specified picture to be printed and the specified additional information are horizontally aligned on a single print paper.

27. A print system comprising a receiving apparatus and a picture forming apparatus,
- wherein the receiving apparatus includes:
    - a receiving unit operable to receive distributed data including a program broadcast via a transmission line and including program information related to the program;
    - a display output unit operable to output, for display or as a signal, the distributed data received by the receiving unit;
    - a program information recording unit operable to record the program information received by the receiving unit;
    - a program identification information recording unit operable to record program identification information that identifies the program to be outputted for display or as a signal by the display output unit;
    - a print instruction obtainment unit operable to obtain a print instruction;
    - a print object specification unit operable to (i) specify, at a time when the print instruction is obtained, one screen of a moving picture to be outputted for display or as a signal by the display output unit as a picture to be printed, (ii) judge whether or not quality of the moving picture is high, (iii) read out program information, related to the program identified by the program identification information recorded in the program identification information recording unit, from the program information recording unit only in a case where the quality of the moving picture is judged to be high, and (iv) specify the read-out program information as additional information identifying an owner of a copyright of the moving picture and being associated with the specified picture to be printed together with the specified additional information; and
    - an output unit operable to combine the specified picture to be printed and the specified additional information associated therewith as combined print data to be printed on a single print paper and operable to output the combined print data to the picture forming apparatus, and
- wherein the picture forming apparatus includes a print unit operable to receive the combined print data sent from the receiving apparatus and print out the combined print data on a print paper.

28. A print system comprising a receiving apparatus and a picture forming apparatus,
- wherein the receiving apparatus includes:
    - a receiving unit operable to receive distributed data including a program broadcast via a transmission line and including program information related to the program;
    - a display output unit operable to output, for display or as a signal, the distributed data received by the receiving unit;
    - a program information recording unit operable to record the program information received by the receiving unit;
    - a program identification information recording unit operable to record program identification information that identifies the program to be outputted for display or as a signal by the display output unit;
    - a print instruction obtainment unit operable to obtain a print instruction;
    - a print object specification unit operable to (i) specify, at a time when the print instruction is obtained, one screen of a moving picture to be outputted for display or as a signal by the display output unit as a picture to be printed, (ii) judge whether or not quality of the moving picture is high, (iii) read out program information related to the program identified by the program identification information recorded in the program identification information recording unit only in a case where the quality of the moving picture is judged to be high, and (iv) specify the read-out program information as additional information identifying an owner of a copyright of the moving picture and being associated with the picture to be printed together with the specified additional information; and
    - an output unit operable to output the specified picture to be printed and the specified additional information associated therewith to the picture forming apparatus, and
- wherein the picture forming apparatus includes a print unit operable to receive the specified picture to be printed and the specified additional information sent from the receiving apparatus and operable to print out the received specified picture to be printed and the specified additional information on a single print paper.

29. A distribution data receiving method comprising:
- receiving data distributed via a transmission line;
- obtaining a print instruction;
- specifying, at a time when the print instruction is obtained, one screen of a moving picture identified in the print instruction, as a picture to be printed, the specified picture to be printed being specified from among the data received by the receiving;
- judging whether or not quality of the moving picture is high;
- specifying additional information identifying an owner of a copyright of the moving picture and being associated with the specified picture to be printed together with the specified additional information, the additional information being specified in association with the specified picture to be printed only in a case where the quality of the moving picture is judged by the judging to be high; and
- the specified picture to be printed and the specified additional information associated therewith as print data to be printed on a single print paper.

30. A computer-readable recording medium having a program recorded thereon, the program causing a computer to function as a receiving apparatus, comprising:
- a receiving unit operable to receive data distributed via a transmission line;
- a print instruction obtainment unit operable to obtain a print instruction;
- a print object specification unit operable to (i) specify, at a time when the print instruction is obtained, one screen of a moving picture identified in the print instruction, as a picture to be printed, the picture to be printed being specified from among the data received by the receiving unit, (ii) judge whether or not quality of the moving picture is high, and (iii) specify additional information identifying an owner of a copyright of the moving picture and being associated with the specified picture to be printed together with the specified additional information, the additional information being specified in association with the specified picture to be printed only in a case where the quality of the moving picture is judged to be high; and
- an output unit operable to output the specified picture to be printed and the specified additional information associated therewith each to be printed on a single print paper.

* * * * *

UNITED STATES PATENT AND TRADEMARK OFFICE
CERTIFICATE OF CORRECTION

| | | |
|---|---|---|
| PATENT NO. | : 7,551,301 B2 | Page 1 of 1 |
| APPLICATION NO. | : 10/502743 | |
| DATED | : June 23, 2009 | |
| INVENTOR(S) | : Takehito Yamaguchi et al. | |

It is certified that error appears in the above-identified patent and that said Letters Patent is hereby corrected as shown below:

In the Claims

In column 29, claim 12, line 18, "based on (ii) the program" should read -- based on (i) the program --.

Signed and Sealed this

Sixteenth Day of February, 2010

David J. Kappos
*Director of the United States Patent and Trademark Office*